Dec. 3, 1968  J. F. REUTELER ET AL  3,414,787
NUMERIC CONTROL AND SERVO SYSTEM
Filed March 4, 1964  14 Sheets-Sheet 3

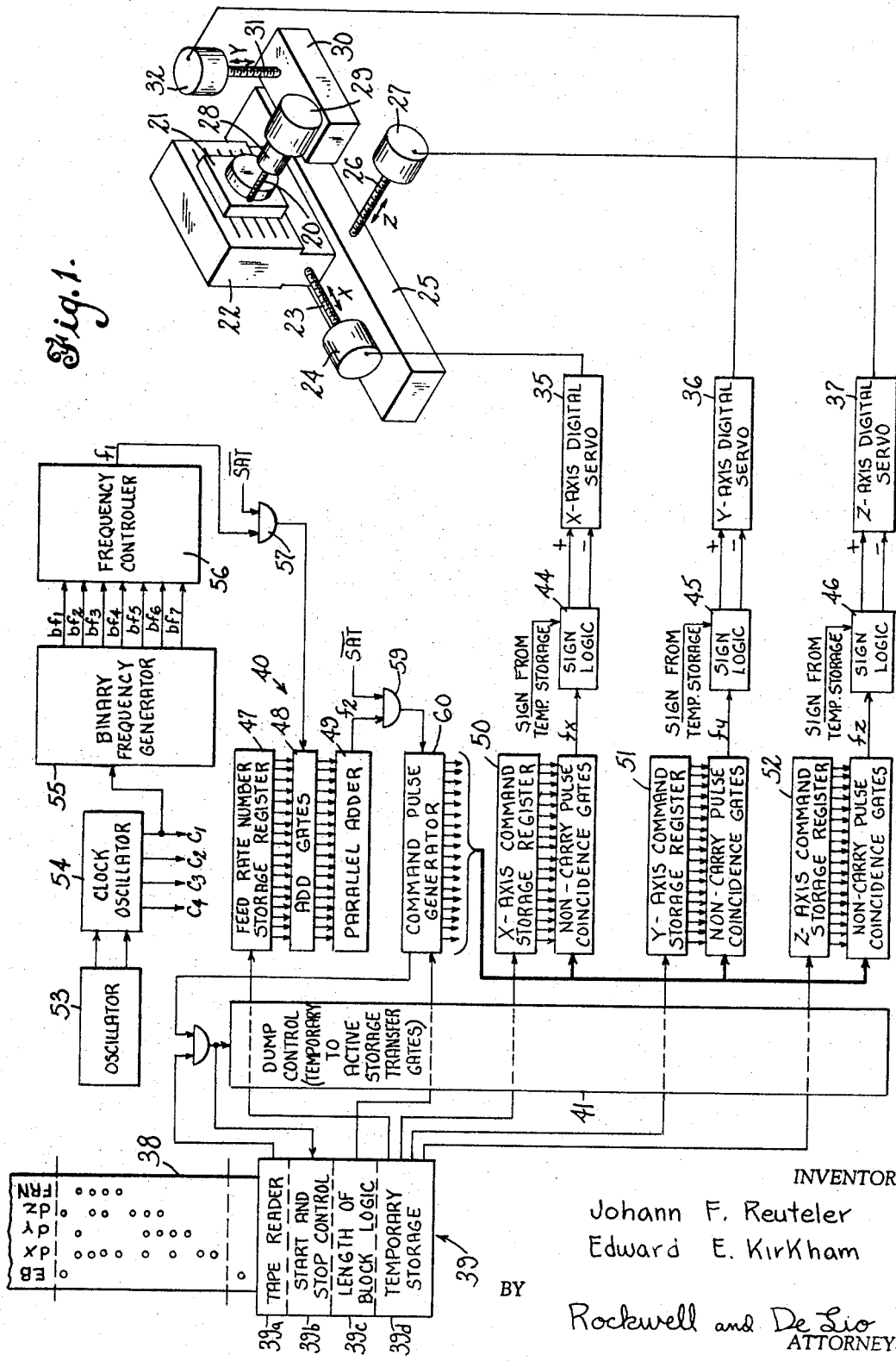

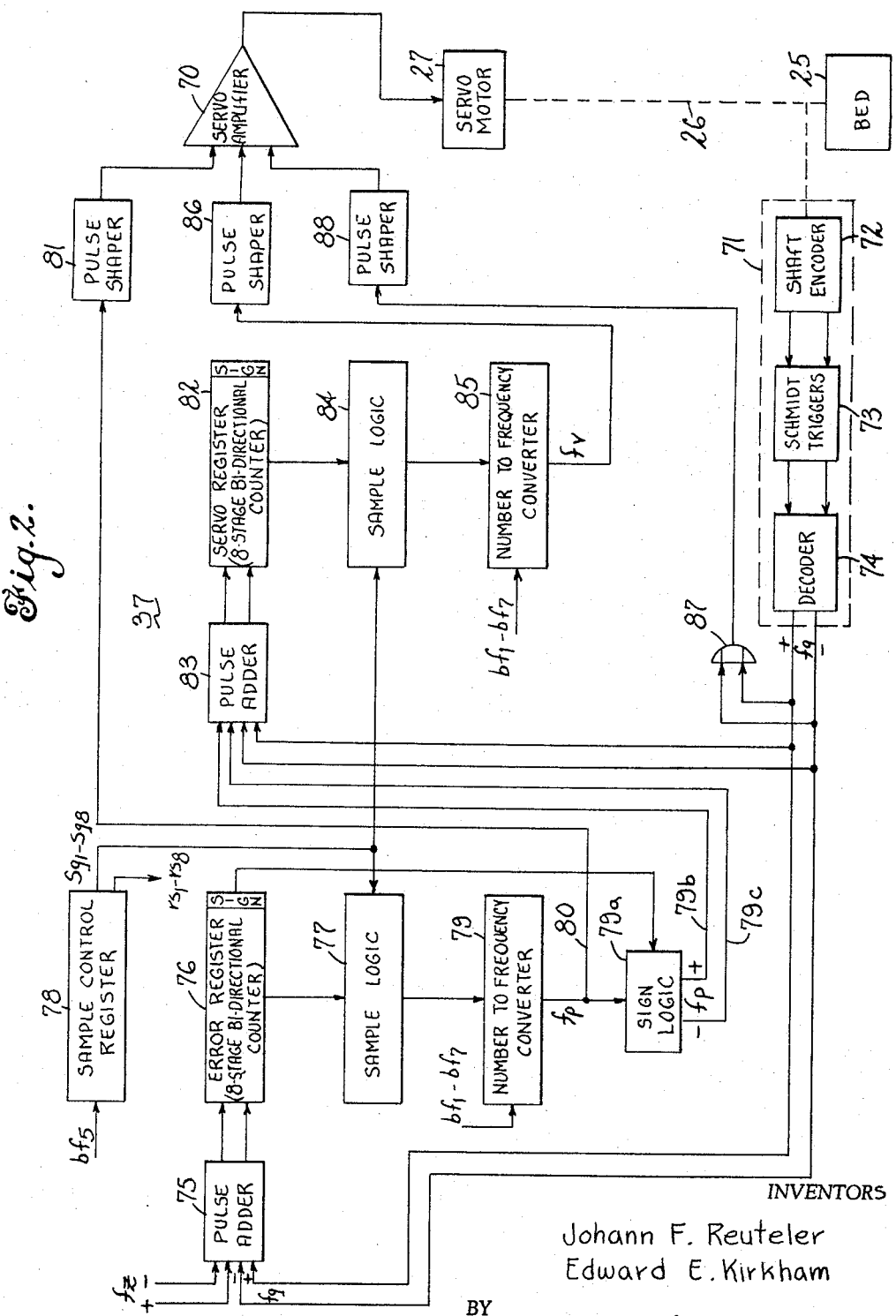

INVENTORS
Johann F. Reuteler
Edward E. Kirkham
BY Rockwell and De Lio
ATTORNEYS

INVENTOR
Johann F. Reuteler
Edward E. Kirkham

BY Rockwell and De Lio
ATTORNEYS

INVENTORS
Johann F. Reuteler
Edward E. Kirkham

BY Rockwell and DeLio
ATTORNEYS

INVENTORS
Johann F. Reuteler
Edward E. Kirkham
BY Rockwell and De Lio
ATTORNEYS

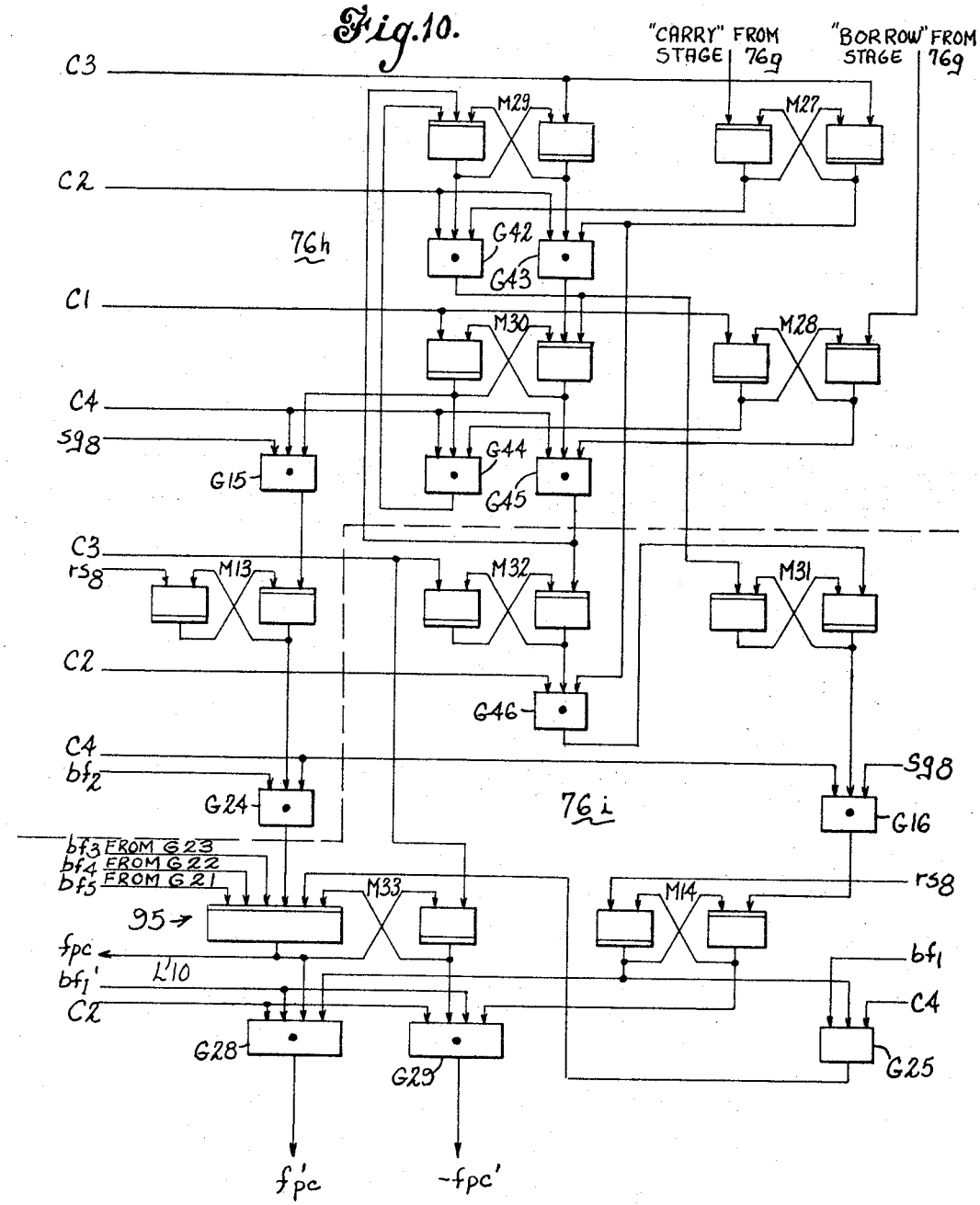

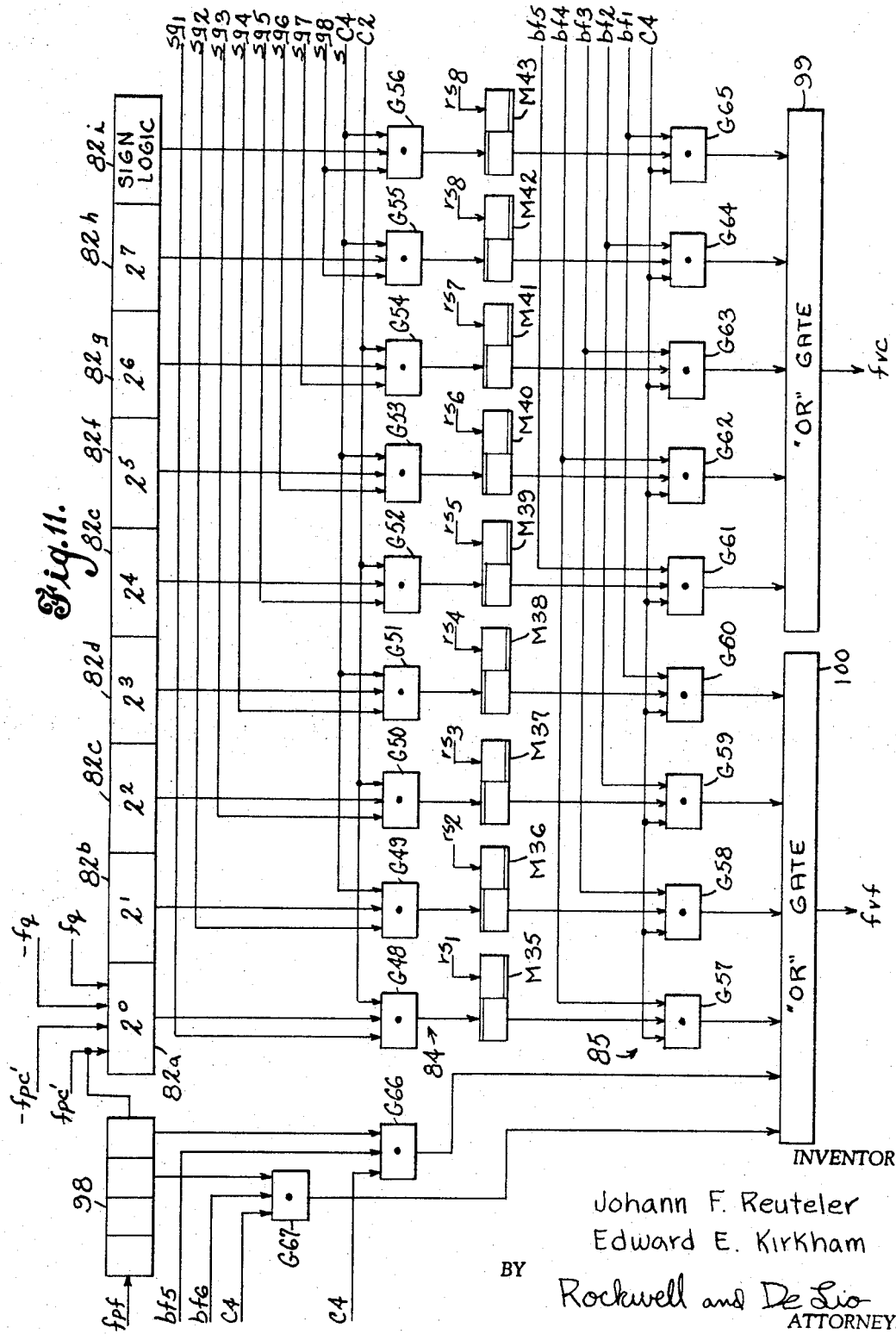

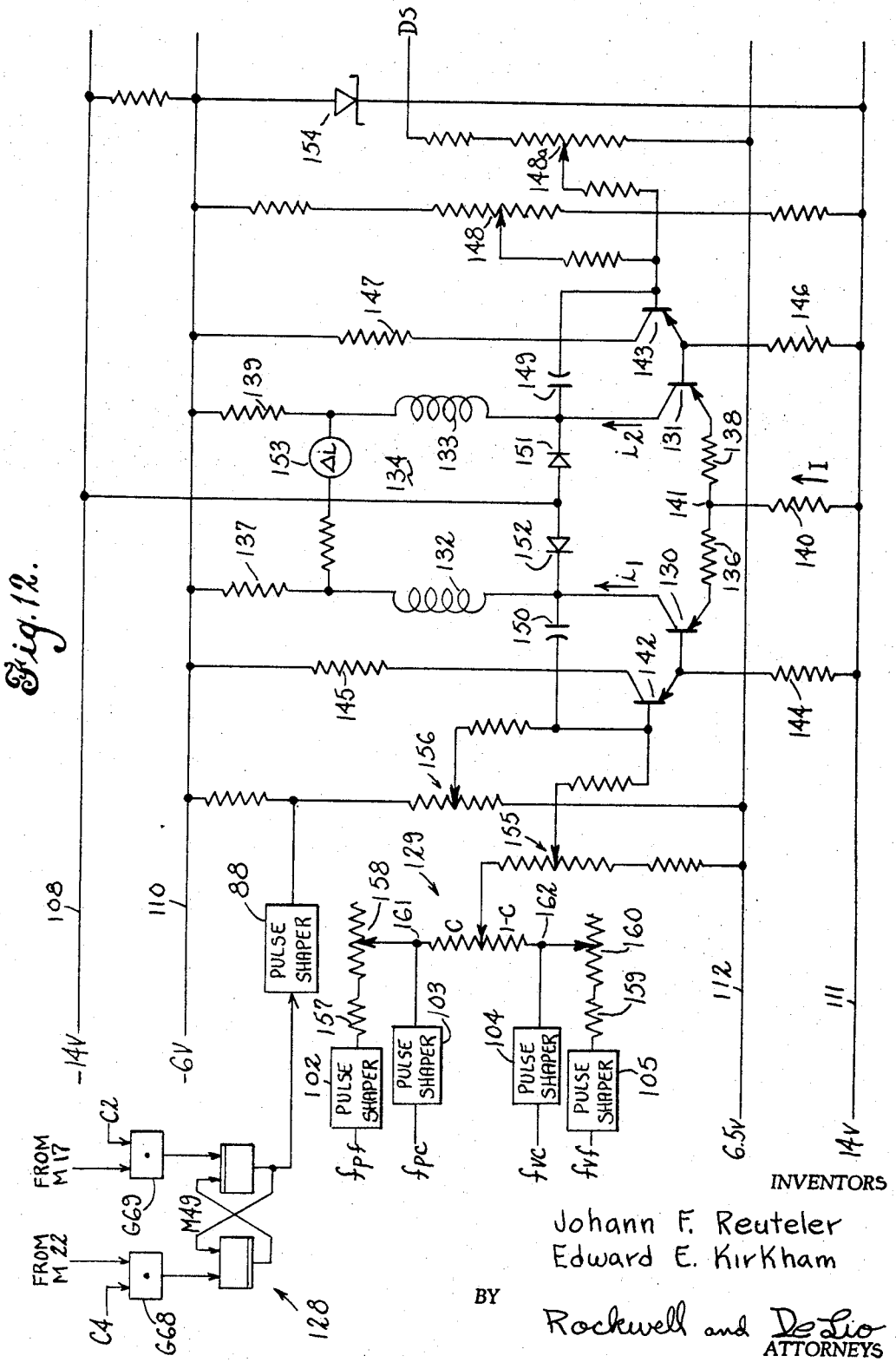

Dec. 3, 1968  J. F. REUTELER ET AL  3,414,787
NUMERIC CONTROL AND SERVO SYSTEM
Filed March 4, 1964  14 Sheets-Sheet 13

INVENTORS
Johann F. Reuteler
Edward E. Kirkham
BY Rockwell and De Lio
ATTORNEYS

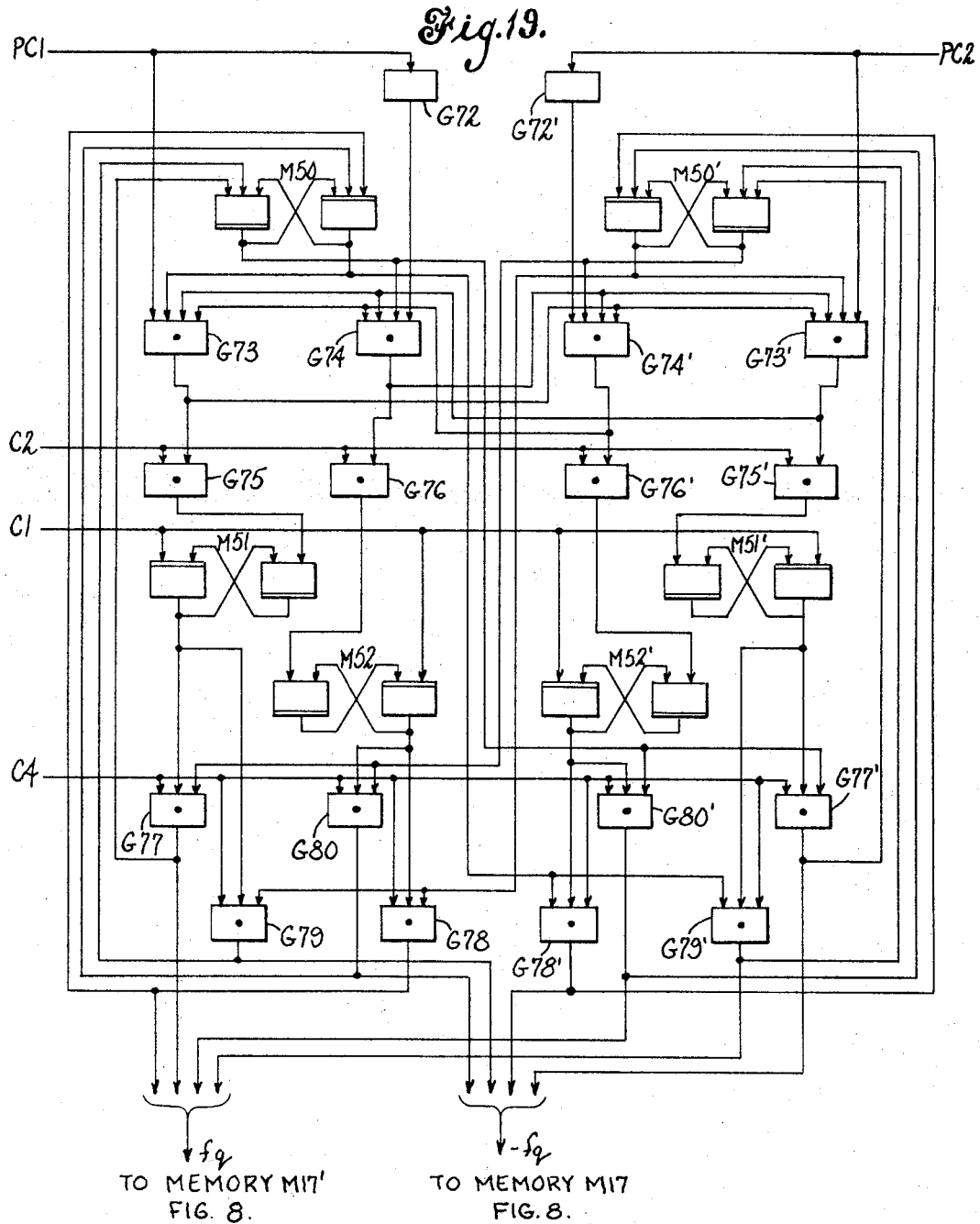

3,414,787
NUMERIC CONTROL AND SERVO SYSTEM
Johann F. Reuteler, Elmwood, and Edward E. Kirkham, Manchester, Conn., assignors to Pratt & Whitney, Inc., a corporation of Delaware
Filed Mar. 4, 1964, Ser. No. 349,222
30 Claims. (Cl. 318—18)

ABSTRACT OF THE DISCLOSURE

This disclosure relates to a servo system which comprises a means for supplying a command signal indicative of the extent of movement and velocity of movement of a controlled object and a means for deriving a feedback signal indicative of the actual extent of movement and velocity of movement of the object. The command and feedback signals are compared to derive a signal indicative of the error between the commanded and actual velocity. The error signal is integrated to provide a representation of the difference between the commanded position and the actual position and further produce a velocity signal proportional to the position representation. The velocity signal and the feedback signal are compared to derive a signal proportional to a new velocity of the controlled object required to eliminate the error. The disclosure also relates to a technique of limiting the velocity of the controlled object when a predetermined velocity error is reached or exceeded.

---

This invention relates to numerical control systems for moving an object along a predetermined path and more particularly relates to digital servo systems which move an object a distance proportional to a number of pulses received thereby.

A numerical control system as described herein is one that is generally referred to as a continuous path or contouring numerical control system. Such systems, which are known to the prior art, generally comprise an input section arranged to receive information, in numerical form from a storage medium, which information indicates commanded distances and rate of relative movement of one or more objects with respect to non-coincidence reference paths; a command generation section which converts the input information into pulse commands indicative of the distance and rate of movement of the objects(s) with respect to the reference paths, and a plurality of servo systems, each of which in response to one of the generated commands, moves the object(s) with respect to one reference path a distance and at a rate determined by the command received by the input section. In numerical contouring controls, a continuous path, other than a linear path, is defined by successive linear increments which essentially define the desired path. For example, a circle would be defined by a multiplicity of chords.

Control systems of the type described generally include means for generating a pulse frequency at a repetition rate proportional to the desired rate movement of the controlled object(s) as will hereinafter be exemplified. The pulses are then delivered to one or more servo systems as command pulses in a quantity indicative of the extent of movement of an object with respect to a reference path and the rate of delivery indicates the desired rate of movement of the object to be moved. Each generated command pulse is representative of an increment of movement. The command pulses are usually generated at the desired rate and the number utilized depends upon the desired distance of movement of the controlled member with respect to a given reference path.

The present invention primarily relates to pulse-responsive servo systems which accept the pulses generated by the command generation section and move an object a distance proportional to the number of pulses received and at a rate proportional to the rate of receipt of the command pulses.

Servo systems using digital technology have been devised where both the input quantity and a feedback quantity in the form of discrete pulses are summed, usually by a bi-directional binary counter, to provide a numerical representation of a position error existing between the commanded position and the actual position. However, these previously devised digital servo systems have then converted the numerical representation of the error in the counting device to a representative analogue quantity. This representative quantity, usually voltage, is then applied to an amplifying device which controls the operation of a prime mover, such as an electric motor or a hydraulic servo motor. This analogue quantity represents the position error of the controlled object. In some digital servo systems, a second analogue quantity representative of the velocity of the controlled object is derived and compared with the first analogue quantity to provide yet another analogue quantity which is then utilized to control the prime mover. This second comparison is made in order to provide a signal which also contains intelligence representing the change in velocity required to keep the tracking error of the system to a minimum under steady state conditions.

The conversion from digital information processing to analogue is within the digital loop of the several servo systems, and the resulting analogue uncertainty is reduced to a small portion of the total information handled. However, the ultimate use of analogue quantities and dependency thereon is somewhat contradictory to the initial use of digital technology to achieve greater accuracy and precision.

In any servo system there is storage in some form of a quantity which represents the difference between an input command and a feedback quantity, and generation or provision of an error signal in response thereto. A digital-to-analogue coverter represents such a storage and error providing function.

This conversion introduces a characteristic which limits the accuracy obtainable. The variable analogue quantity often has a drift tendency dependent on the characteristics of components used in the system, such as initial precision, age of the components and the operating temperature. In numerical control systems using two or more servo systems which control the path of movement of a controlled member or which may move a first member relative to a second member with respect to non-coincidence reference paths, this problem is compounded. In such systems each servo system may have a different drift factor which results in a greater total error.

The present invention provides a new and improved digital servo system which overcomes the above discussed uncertainties and limitations. This invention provides a digital servo system which does not require the use of a digital-to-analogue converter, nor the use of separate means such as a tachometer to provide a signal indicative of the velocity of the controlled object. The present invention uses a single transducer to provide a series of feedback pulses indicative of both positions and velocity of the controlled object. The feedback pulses are numerically compared with the movement command pulses to establish a representation of the servo system velocity error. This velocity error is integrated by means of a summing device in the form of a bidirectional counter. The result of this integration is a numerical quantity which is the system position error. The numerical error is then converted to a first series of pulses representing a velocity which is a function of the position error. This first series of pulses is then numerically compared with the train of feedback pulses.

The result of this comparison is a second series of pulses having an average repetition rate proportional to the required change in velocity of the controlled object. In accordance with another aspect of the invention this velocity error is stored as a numerical quantity in a digital counting device which eliminates uncertainties and inaccuracies in storage of the velocity error. The stored numerical quantity is then converted to a second series of pulses proportional in number and rate to the stored numerical quantity, which pulses control operation of the servo system prime mover. With this arrangement, the numerical representation of the required velocity change is stored in digital form without any drift tendency and no separate compensating velocity error signal is required.

The invention also provides new and improved means for overriding a programmed machine workrate when necessary to prevent excessive error and possible loss of synchronization of operation. In continuously controlled servo systems such as contouring controls, it is usually the prime mover which determines the maximum velocity of the controlled object. If a velocity is programmed that is higher than this maximum, or if existing operating conditions demand a slower workrate, the controlled object will lag behind the commanded position. In a digital servo system this results in a buildup in the position error quantity in the error register, i.e., the bi-directional counter and possible overflow of the counter. This results in a loss of synchronization between the command generation portion of the system and the servo system.

Previously, digital servo systems have detected when the position error exceeds allowable limits and shut the system down. When this occurs, the operator must reset the controls and report a portion of the movement previously accomplished to bring the controlled object back to the point where synchronization was lost. To avoid this possibility, the system must be programmed such that the velocity demand stays safely below the capability of the servo system. This results in lost time and inefficient utilization of the controlled objects.

The present invention includes means for insuring full use of the capabilities of the servo system without loss of synchronization between commanded and actual position. Means are provided to sense when the position or velocity error has reached a predetermined magnitude at or near the capacity of the error storage means and interrupt generation of all command pulses and application of such command pulses to all servo systems until such time as the feedback pulses have decreased the error below the predetermined magnitude. This does not shut down operation of the servo systems but merely slows down the velocity of the controlled parts, so that their programmed relationship to one another is not changed. In a preferred form the velocity limiting means is an on-off control.

An object of this invention is to provide a new and improved numerical control including digital servo systems.

Another object of this invention is to provide a new and improved digital servo system.

Another object of this invention is to provide a new and improved digital servo system wherein a single transducer arrangement is utilized to provide feedback pulses which affect both position and rate control of a controlled object.

Another object of this invention is to provide a new and improved digital servo system which requires only one feedback pulse-generating means to indicate both position and velocity of the controlled object.

Another object of this invention is to provide a new and improved digital servo system which does not require storage of a quantity in analogue form.

Another object of this invention is to provide a new and improved digital servo system using only digital components.

A further object of this invention is to provide a numerical control system having a plurality of digital servo systems with new and improved means for detecting an error of predetermined magnitude in the velocity of any controlled object and slowing down operation of all servo systems such that the programmed relationship to one another is not affected.

The features of the invention which are believed to be novel are pointed out with particularity and distinctly claimed in the concluding portion of this specification. However, the invention, both as to its organization and operation together with further objects and advantages may best be appreciated from the following detailed description taken in conjunction with the drawings, in which:

FIG. 1 is a functional block diagram of a numerical control system including digital servo systems which embody the invention;

FIG. 2 is a block diagram of a digital servo system embodying the invention;

Figure 4A:
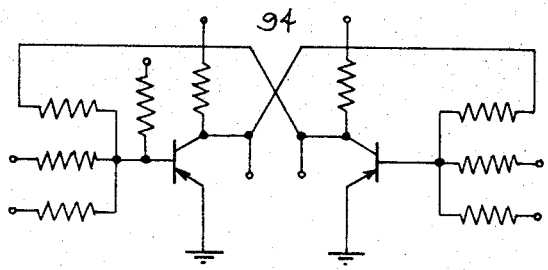
Figure 4B:
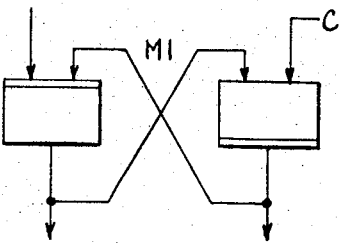
Figure 4C:
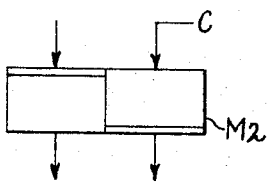
Figure 5:
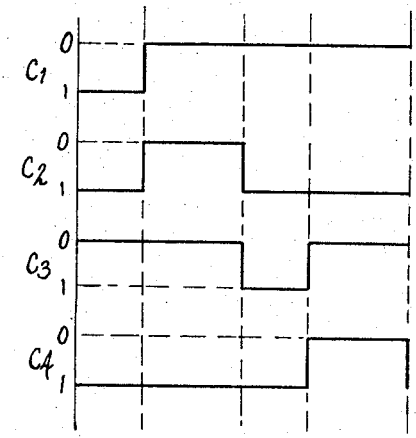
Figure 6:
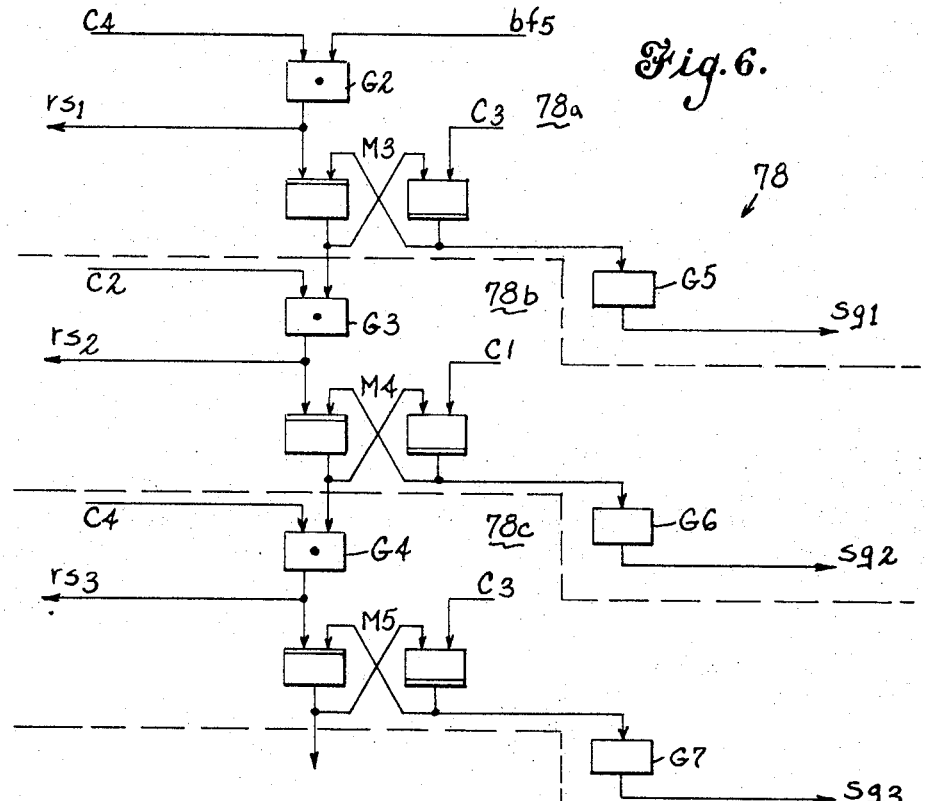
Figure 7:
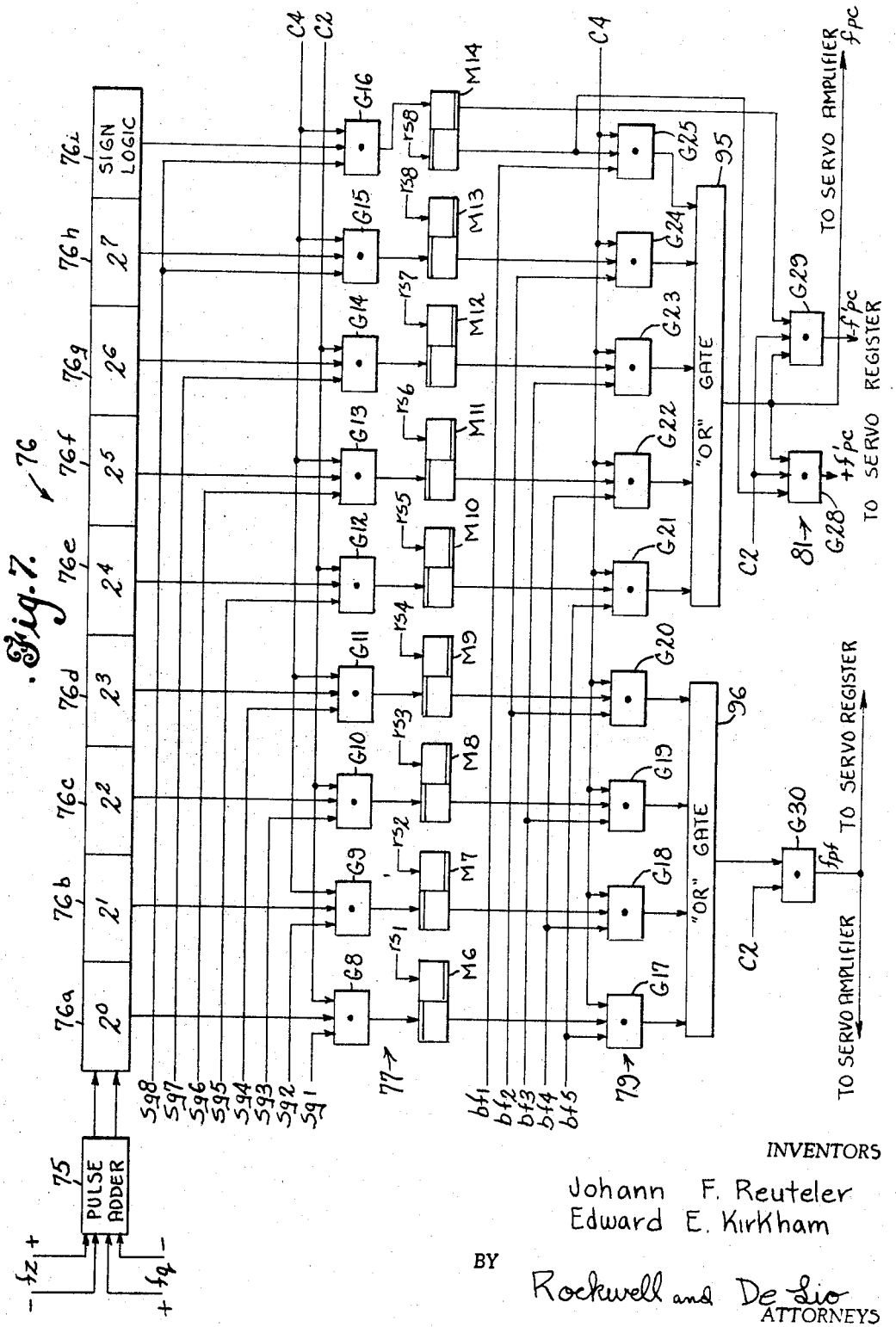

FIGS. 4a, 4b, and 4c are diagrams of a bi-stable device;

FIG. 5 is a diagram of the waveform of the clock oscillator of FIG. 1;

FIG. 6 is a schematic diagram of a serial pulse generator used for gating and resetting purposes;

FIG. 7 is a diagram, partly schematic and partly in block form of the position error register, sampling logic and number-to-frequency converter shown in functional block form in FIG. 2.

Figure 8:
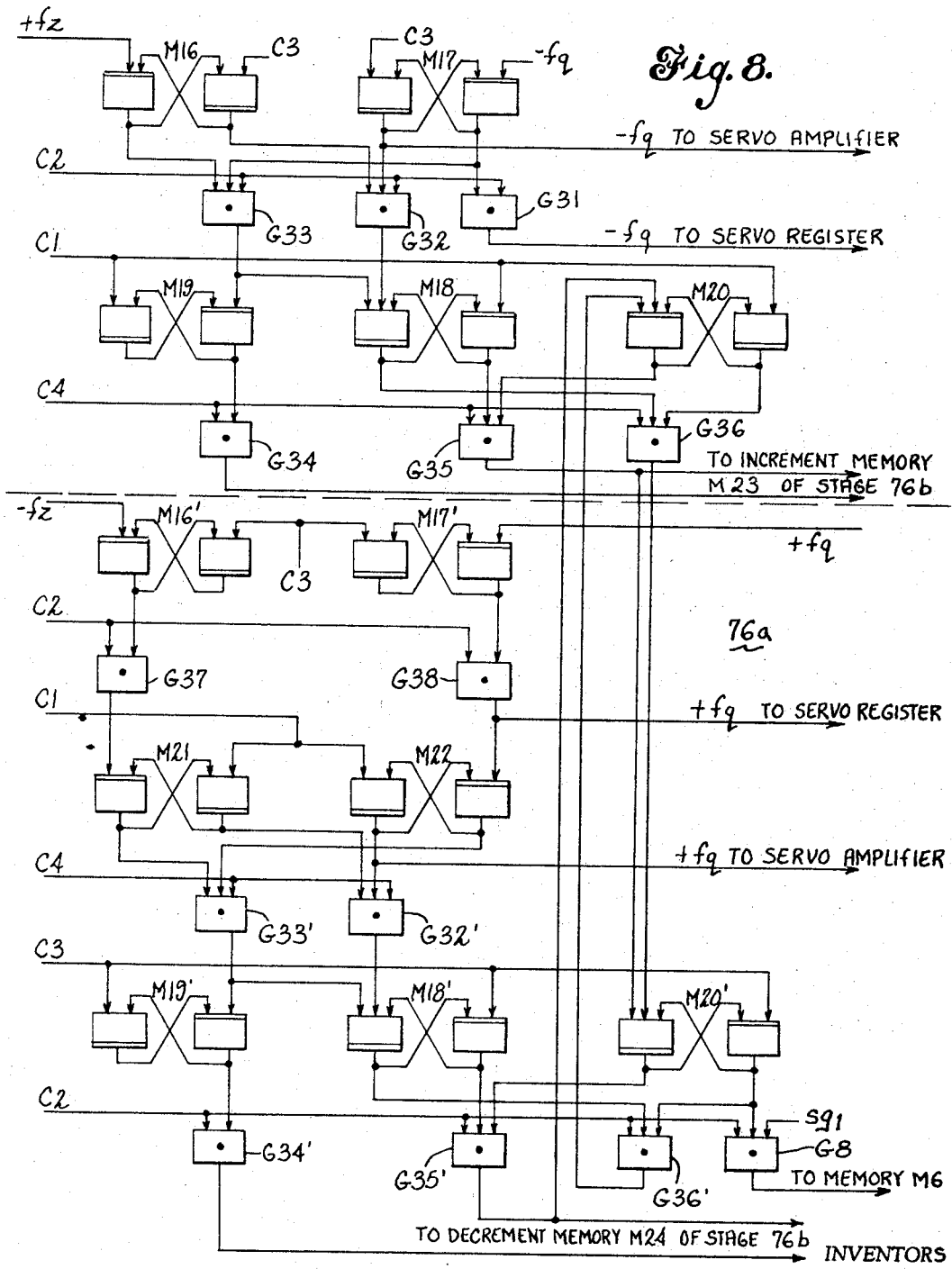
Figure 9:
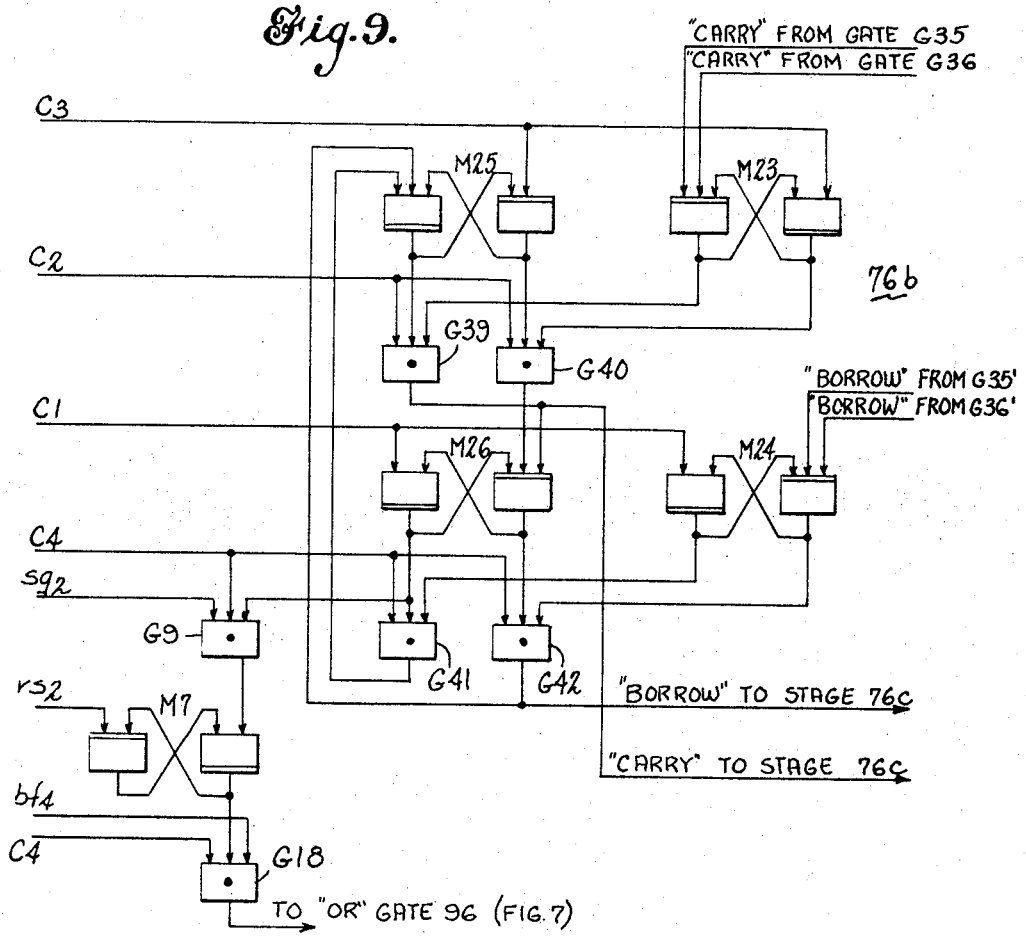

FIG. 8 is a schematic diagram of the input stage of a bi-directional counter, comprising the error register of FIG. 7, adapted to receive incrementing and decrementing pulse inputs;

FIG. 9 is a continuation of FIG. 8 showing the second stage of the binary counter;

FIG. 10 is a schematic diagram of the most significant numerical stage of the binary counter initially shown in FIG. 8, together with a concluding stage which senses the algebraic sign of the number in the counter.

Figure 16:
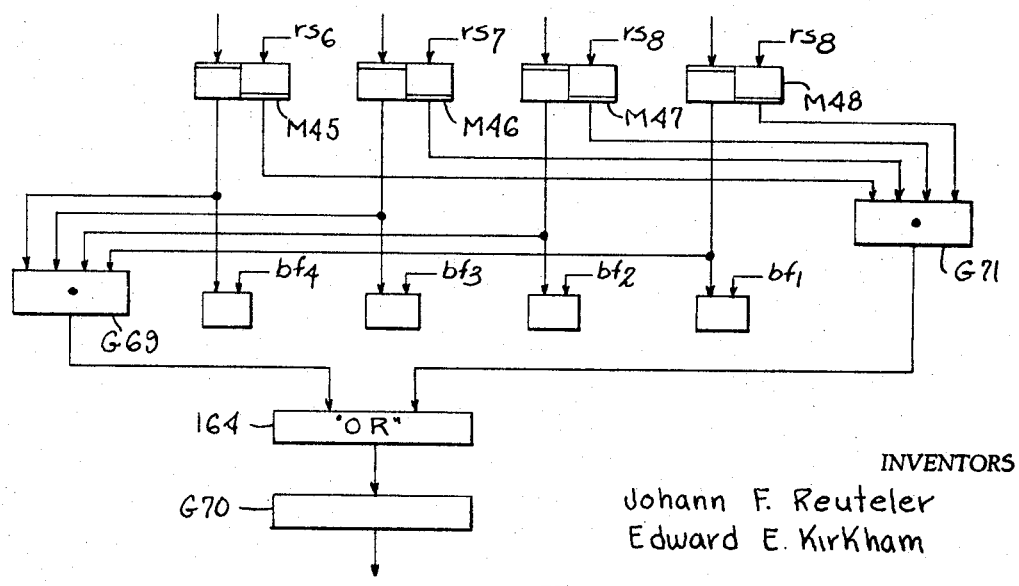
Figure 13:
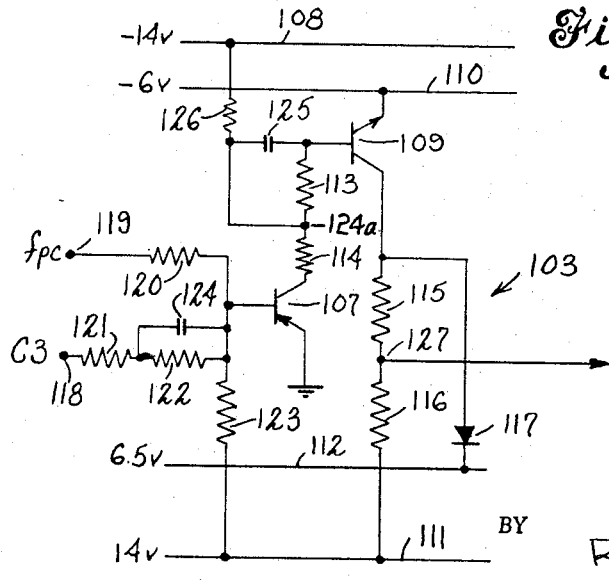
Figure 14:
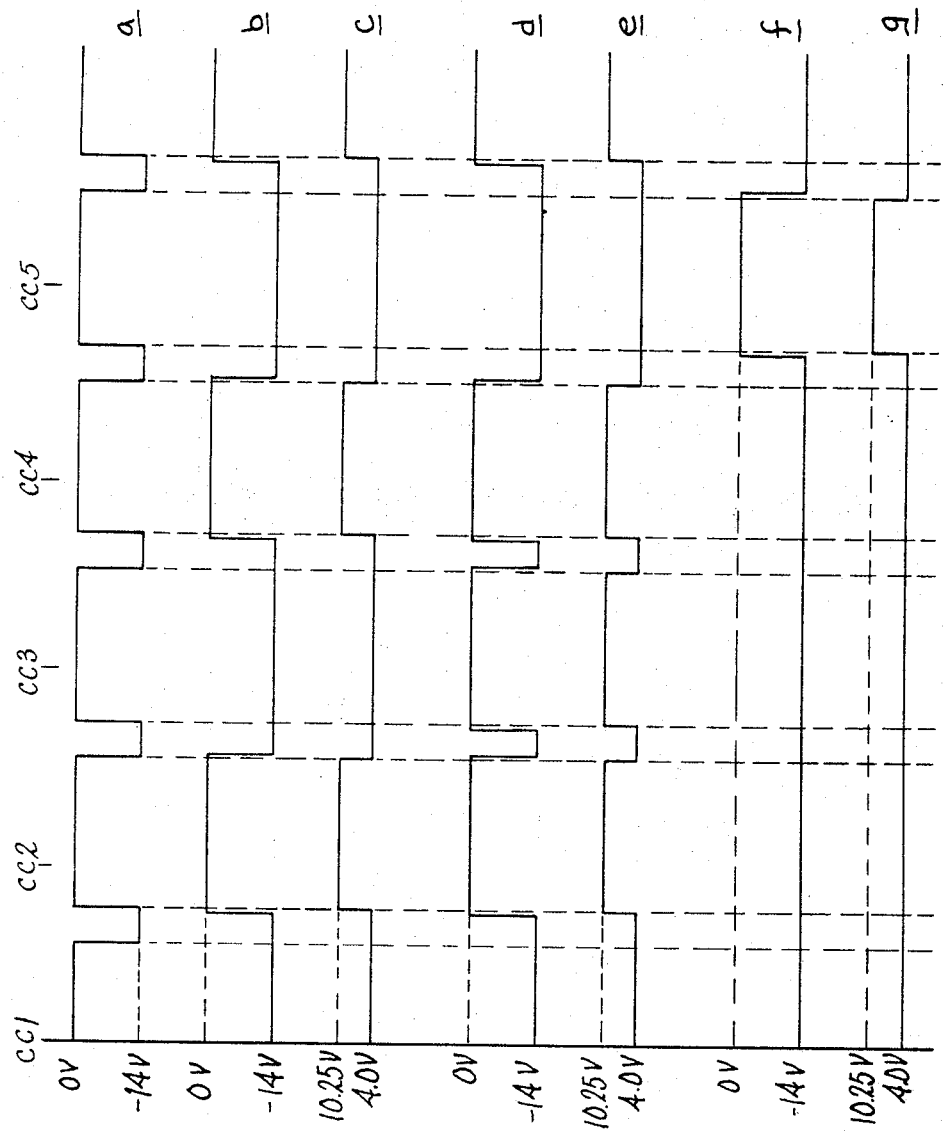
Figure 15:
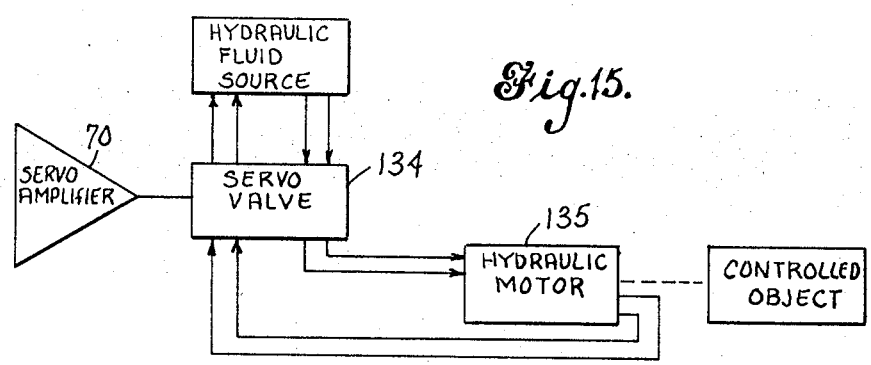
Figure 18:
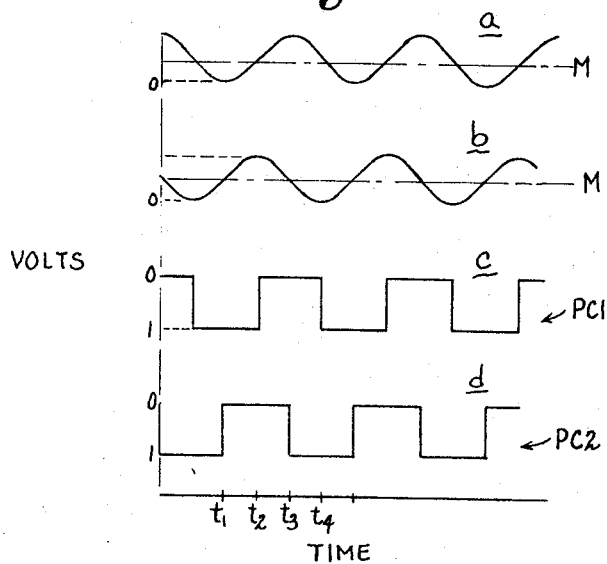
Figure 17:
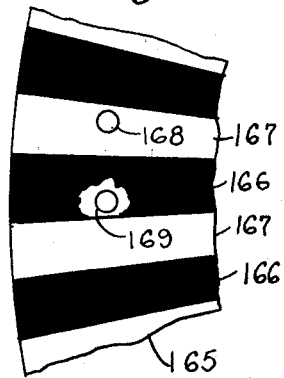

FIG. 11 is a diagram, partly schematic and partly in block form of the servo register of FIG. 2 together with associated sample logic and number-to-frequency converter previously shown in functional block form in FIG. 2;

FIG. 12 is a schematic diagram of a servo amplifier;

FIG. 13 is a schematic diagram of a preferred pulse shaper;

FIG. 14 is a voltage vs. time plot of the output waveform of the pulse shaper of FIG. 13;

FIG. 15 is a functional block diagram of the drive end of a typical servo system;

FIG. 16 is a schematic diagram of a circuit utilized to sense when an error between a commanded position or velocity and the actual quantity reaches a predetermined magnitude;

FIG. 17 is a diagram of a quantizer disk utilized in generating feedback pulses;

FIG. 18 is a diagram of the waveforms derived from the quantizer disk of FIG. 16 and associated trigger circuits;

FIG. 19 is a schematice diagram of a decoding network which determines the direction of movement of a controlled object and produces pulses in response to the magnitude and direction of movement thereof.

General arrangement

A numerical control system including a plurality of digital servo systems embodying the invention is first described functionally with reference to FIG. 1. The embodiment of the invention disclosed controls the motion of a first controlled object, cutting tool 20, relative to a second controlled object, workpiece 21, with respect to a plurality of non-coincident reference paths here illustrated as mutually perpendicular X, Y and Z axes. Relative motion between the cutting tool 20 and workpiece 21 is achieved by moving a workpiece holder 22 in either direction with respect to the X-axis by means of a lead screw 23 driven by an X-axis prime mover 24 mounted on a bed or base 25. Bed 25 is moved in either direction with respect to the Z-axis by means of a lead screw 26 driven by a prime mover 27. Cutting tool 20 is carried in a spindle 28 driven by a motor 29 mounted on a base member 30. Base 30 is movable in either direction with respect to the Y-axis by means of a lead screw 31 driven by a prime mover 32.

The prime movers 24, 27 and 32 may be electrical or hydraulic servo motors which are operated in response to the output of X, Y and Z axes digital servos 35, 36 and 37.

The digital servos 35, 36 and 37 receive movement commands in the form of discrete pulses. Each pulse applied to a servo is a command indicative of a unit distance of movement of the object controlled thereby along a particular axis. The rate of movement of the objects controlled by each servo is determined by the rate of application of command pulses thereto.

The movement commands for each axis are derived from an external medium comprising in a preferred form a flexible, essentially continuous tape 38. Various commands are encoded in binary form in parallel columns on the tape 38. The commands are feedrate number FRN which determines, at least in part, the rate of production of command pulses and hence the workrate of the machine or part being controlled; delta X ($dx$) which determines movement of work holder 22 along the X-axis; delta Y ($dy$) which determines movement of base 30 and hence cutting tool 20 relative to work holder 22 with respect to the Y-axis; delta Z ($dz$) which determines movement of bed 25 and hence work holder 22 with respect to the Z-axis; and an end of block notation EB which signifies the end of a block of information on the tape. The delta or movement commands are represented by a binary number, each unit count of the number being equal to a predetermined increment of movement along a particular axis. The last perforation or absence thereof in the $dx$, $dy$ and $dz$ columns indicates the direction of movement; for example, the direction of movement in the X and Y directions in the illustrated example is positive as indicated by lack of a hole in the last space in that column, while the direction of movement in the Z-axis is negative as determined by the presence of a perforation in the last space in the $dz$ column. The number represented in binary form in the FRN column is a feedrate number FRN which primarily determines the rate in which command pulses are supplied to the servo systems, and consequently controls the rate of motion of the machine parts.

The channel designated EB contains the end of block indication, identified by the presence of a perforation at the end of that column. This code appears in the same row as that which contains algebraic signs of $dx$, $dy$ and $dz$. The EB code provides stops between commands so that one command may be distinguished from the next. The blocks of information may be of any predetermined length as needed and are made as long as the longest binary command of any of the delta or feedrate commands, within the capacity of the system as will hereinafter be made apparent. The blocks of information on the tape are succesfully fed into the system to insure continuous relative movement of cutting tool 20 with respect to workpiece 21. While the input medium has been illustrated as an essentially continuous tape having perforations thereon it will be understood that the input medium may take any suitable form.

The system comprises an input and temporary storage section identified by reference numeral 39 which comprises a tape reader 39a for reading the notations on tape 38 into the system, a stop and start control 39b which commences reading of a block of information from the tape and stops reading when the end of block notation is reached, logic means to determine the length of a block of information read, and a temporary storage section which stores the information on a block of tape before it is transferred to the interpolation section 40 of the system, as hereinafter described.

When a block of information has been read from the tape, the information in that block is maintained in binary notation in temporary storage registers until a signal from the interpolation section 40 of the system indicates that the previous block of information fed into the machine has been completely utilized. At this time the start and stop control 39b transfers the contents of temporary storage section 39d to interpolation and command generation section 40 of the system through a dump control 41 which comprises a plurality of coincidence gates (not shown in detail) which are enabled by a dump control gate 42. Gate 42 receives a signal from the tape reader stating that a block of information has been read, and also a signal from the interpolation section 40 of the machine stating that the previous block of information read in has been utilized, and the interpolation system is ready to receive the next block of information. At the time information is transferred from temporary storage to active storage in interpolation section 40, sign logic elements 44, 45 and 46 for each axis of motion are set in a state indicative of the direction of motion indicated on the block of tape for the block of information which has just been transferred.

When information has been transferred from temporary to active storage it must now be interpolated for use by the digital servos 35, 36 and 37. The interpolation section 40 of the system comprises a feedrate number storage register 47 which stores the feedrate number FRN in binary notation, a series of add gates 48 and a parallel adder 49 whose function is hereinafter described. The $dx$, $dy$ and $dz$ movement commands are stored in binary form in storage registers 50, 51 and 52, respectively. Storage registers 50, 51 and 52 each comprise a multiplicity of bi-stable devices which are set in a state indicative of the binary movement command for that axis.

The system includes a clock oscillator 54 which repetitively provides four clock signals, C1, C2, C3 and C4 as hereinafter explained in conjunction with FIG. 5. Clock oscillator 54 receives driving signals from an oscillator 53. One of the clock signals, here illustrated as C1, is applied to a binary frequency generator 55 which provides a plurality (seven as here illustrated) of binarily related frequencies $bf_1$–$bf_7$ where the pulses of each frequency are non-coincident with the pulses of the other frequencies. Binary frequency generator 55, in a preferred form, comprises a uni-directional serial pulse counter having a plurality of bi-stable devices and logic means to detect the occurrence of a non-carry, that is, when a stage of the counter changes from binary "0" to binary "1." Thus, a $bf_1$ pulse will occur every second clock cycle, a $bf_2$ pulse will occur every fourth clock cycle, a $bf_3$ pulse will occur every eighth clock cycle, etc.

Table I shows the number of $bf_1$–$bf_7$ pulses which will occur during one hundred twenty-eight clock cycles.

TABLE I

| | |
|---|---|
| Clock cycles | 128 |
| $bf_1$ | 64 |
| $bf_2$ | 32 |
| $bf_3$ | 16 |
| $bf_4$ | 8 |
| $bf_5$ | 4 |
| $bf_6$ | 2 |
| $bf_7$ | 1 |

In the following description reference will be made to various "pulse frequencies." These pulse frequencies are measured as a number of pulses in a number of clock cycles and do not necessarily relate to a constant repetition rate usually expressed as cycles/second.

The $bf_1$–$bf_7$ pulse frequencies or selected ones thereof are applied to a frequency controller 56 which comprises a means for gating selected ones of pulse frequencies $bf_1$–$bf_7$ therethrough to provide a selectable pulse frequency $f_1$. Pulse frequency $f_1$ is applied through a coincidence gate 57 to add gates 48. Gate 57 is enabled so long as a saturation error signal SAT is not received, as will hereinafter be explained. The application of $f_1$ pulses to add gates 48 enables the gates 48 to pass the numerical content of feedrate number storage register 47 to parallel adder 49. The feedrate number in binary form is thus added to the number in parallel adder 49 a number of times and at a rate determined by pulse frequency $f_1$. The parallel adder will thus produce an overflow pulse frequency $f_2$ which has a repetition rate proportional to the federate number FRN and the repetition rate of pulse frequency $f_1$. Pulse frequency $f_2$ is then passed through a coincidence gate 59, having a function similar to gate 57, to a command pulse generator 60 here illustrated as having eighteen binary stages. Command pulse generator 60 is basically a uni-directional binary counter and further includes logic for detecting non-carries to provide eighteen binarily-related pulse frequencies. Command pulse generator 60 has the counting portion thereof preset with binary "1's" in the most significant positions thereof determined by the length of the block of information upon which it is then operating. Command pulse generator is preset from length of block logic section 39c of the input in temporary storage section 39. The command pulse generator output frequencies are then applies to non-carry pulse coincidence gates for each axis. Each of the blocks indicated by reference numerals 61, 62 and 63 comprise eighteen coincidence gates adapted to pass selected ones of the pulse frequencies from command pulse generator 60 when enabled by a binary "1" notation in a corresponding binary position of an associated axis command storage register. In the example given, the most significant position of an axis distance command gates the largest pulse frequency of command pulse generator 60. In this manner a number of command pulses are derived for each axis of motion which are equal to the binary movement command for that axis, and the command pulses derived are produced at a rate proportional to pulse frequency $f_2$, which is counted by command pulse generator. The pulse frequency outputs $f_x$, $f_y$ and $f_z$ of each of the non-carry pulse coincidence gates 61, 62 and 63 are applied to sign logic elements 44, 45 and 46, respectively, which determine the direction of motion of a controlled part with respect to each reference path. The $f_x$, $f_y$ and $f_z$ pulse frequencies are then applied to appropriate servos at either a positive or negative input. A positive input signifies that the servo system is to move its controlled object in a positive direction along its path of movement. A negative input signifies that the servo system is to move its controlled object in a negative direction along its path of movement.

A numeric control system as thus far described is disclosed in detail and claimed in the co-pending application of Johann F. Reuteler, Ser. No. 349,215 filed on the same date as this application, and assigned to the same assignee as this application. The disclosure of this co-pending application is incorporated herein by reference.

Servo system

Each of the servo systems 35, 36 and 37 is identical. FIG. 2 illustrates in block form the Z-axis servo system 37. Servo system 37 is a second order or two-loop servo system in which a servo amplifier 70 receives pulse inputs directly without requiring a digital-to-analogue converter. Servo system 37 includes a means for generating discrete feedback pulses $f_q$, each proportional to an incremental distance of movement of a controlled object, here illustrated as bed 25. The pulse generating means comprises an element generally referred to as a quantizer 71 which provides output pulses $f_q$ over a positive or negative output line determined by the direction of movement of the controlled part with respect to its particular axis of movement. The quantizer 71 in a preferred form comprises a shaft encoder 72, mechanically connected to either the prime mover or lead screw 26, which furnishes output waveforms, each comprising a number of pulses indicative of the rotation of lead screw 26 and so related in phase as to indicate the direction of rotation of lead screw 26. The output waveforms of shaft encoder 72 are applied to pulse shaping networks which are preferably Schmitt trigger circuits 73, well known to those skilled in the art. The output of the Schmitt triggers are applied to a decoding network 74 which senses the direction of rotaton of lead screw 26 and provides a pulse frequency output $f_q$ over either a positive or negative output line. The output pulses $f_q$ are each indicative of an incremental movement of the controlled member bed 25 which increment of movement is equal to the increment of movement commanded by each command pulse $f_z$.

Servo system 37 further comprises a pulse adder 75 which accepts plus or minus $f_z$ and $f_q$ pulses and applies $f_z$ and $f_q$ pulses to an error register 76. Error register 76 stores a numerical count proportional to the difference in the number of $f_z$ command pulses and feedback $f_q$ pulses received thereby. This numerical count represents the system position error. Error register 76 comprises an eight-stage bi-directional counter as hereinafter more fully described and a ninth-stage which determines the algebraic sign of the number held therein. Pulse adder 75 passes $f_z$ or $f_q$ pulses to error register 76 to either increment or decrement error register 76 dependent upon the sign of the pulse. If $f_z$ and $f_q$ pulses occur simultaneously they are algebraically added by pulse added 75 before being passed to error register 76.

The numerical content of error register 76 is sampled every thirty-two clock cycles by a sample logic network 77 controlled by a sample control register 78 which in turn is activated by a $bf_5$ pulse which occurs every thirty-second clock cycle. Sample control register 78, as will hereinafter be more fully described, is in effect a shift pulse generator having a number of shift stages which sequentially generate shift pulses $sf_1$–$sf_8$ in response to application of a $bf_5$ pulse thereto. The shift, or as hereinafter specified, sample pulses, $g_1$–$g_8$ occur every half clock cycle, commencing every thirty-second clock cycle.

The sampled numerical content of error register 76, which is stored in sample logic network 77 every thirty-second clock cycle is applied to a number-to-frequency converter 79, which produces a pulse frequency $f_p$, having a number of pulses proportional to the sampled numeric content of error register 76. Pulse frequency $f_p$ is immediately applied over line 80 through a pulse shaper 81 to servo amplifier 70. Pulse frequency $f_p$ is also applied through a sign logic element 79a and hence over a line 79b or 79c dependent upon the algebraic sign of the sampled number to a servo register 82 through a second pulse adder 83. Pulse adder 83 also receives positive or negative $f_q$ pulses from quantizer 71 and functions in the same manner as previously described for pulse adder 75. The pulses $f_p$ and $f_q$ are applied to servo register 82, which is substantially identical to error register 76, to either increment or decrement the number in servo register 82. The number stored in servo register 82 represents the system velocity error. A second sample logic network 84 is provided to sample the numerical content of servo register 82 under the control of sample control register 78. This numerical content of sample logic network 84 is then applied to number-to-frequency converter 85 which provides an output pulse frequency $f_v$ having a number of pulses proportional to the sampled numerical content of servo register 82. Pulse frequency $f_v$ is then passed to servo amplifier 70, through a pulse shaper 86. The quantizer output pulses $f_q$, both positive and negative, are passed by an OR gate 87 to servo amplifier 70 through a pulse shaper 88. The pulse shapers 81, 86 and 88 as hereinafter explained receive $f_p$, $f_v$ and $f_q$ pulses, respectively, and shape each pulse into corresponding pulses, all having equal amplitude and pulse widths.

The function of the sample logic networks 77 and 79 is to sample the numbers in registers 76 and 82 to provide static storage of the numbers therein for conversion to a pulse frequency. This is to provide a number for conversion to a frequency which is not subject to change by borrows or carries.

Figure 2A:
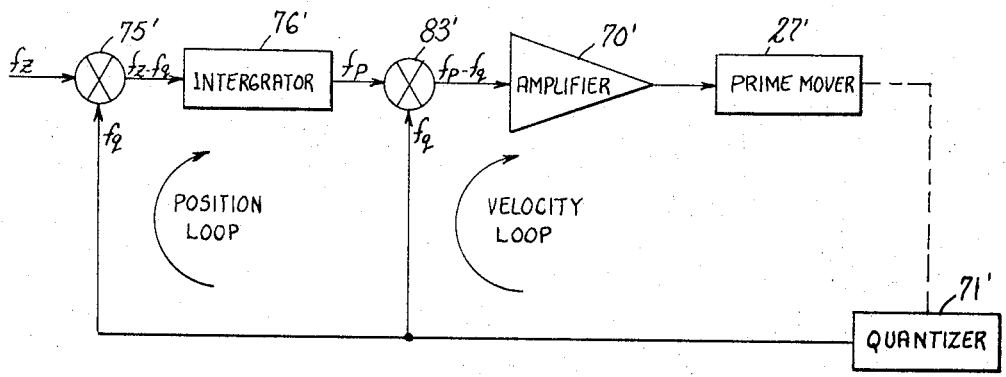
FIGS. 2a and 2b are functional diagrams of servo systems which aid in explanation of operation of the servo system of FIG. 2.
Figure 2B:
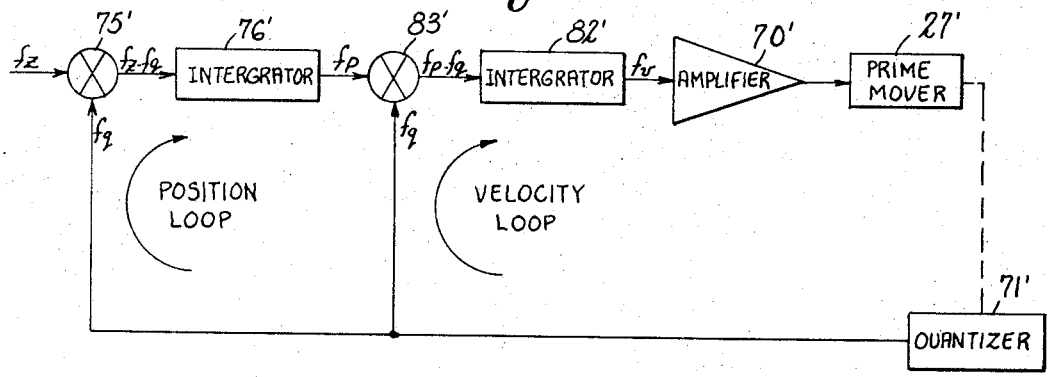
Figure 2C:
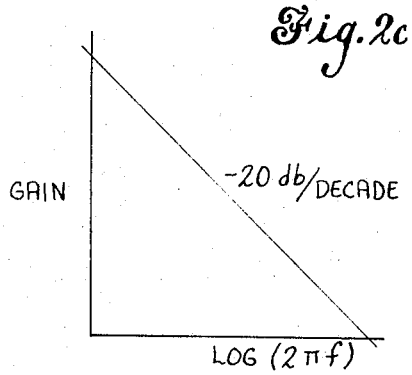
FIG. 2c is a graphical representation of the gain vs. frequency curve of the servo system of FIGS. 2 and 2b.

Reference is now made to FIGS. 2a, 2b, and 2c which aid in an explanation of the features of the servo system of FIG. 2. FIGS. 2a and 2b show a functional development of the system of FIGS. 2 and FIG. 2c is a gain versus frequency shift curve for the servo system of FIG. 2 and 2c. In FIG. 2a the command pulse frequency $f_z$ is applied to a summing device 75' at a rate indicative of the commanded velocity of the controlled part, bed 25. The feedback pulse frequency $f_q$ is also applied to summing device 75' at a rate indicative of the actual velocity of the controlled part. The algebraic summation of the $f_z$ and $f_q$ pulses produces a velocity error which is the numeric count summed by an integrator 76' corresponding to error register 76 and associated number-to-frequency converter. The algebraic summation of $f_z$ and $f_q$ pulses is in effect an integration of the servo system velocity error which results in a numerical magnitude representing the system position error. This position error is then converted to a pulse frequency $f_p$ proportional to the position error. The repetition rate of pulse frequency $f_p$ thus represents a velocity that is a function of the system position error.

Then $f_p$ pulses are algebraically summed with $f_q$ pulses at summing device 83'. This results in a pulse frequency $f_p-f_q$ which is proportional to the required velocity change to eliminate the velocity error. The pulse frequency $f_p-f_q$ could be utilized to control the prime mover 27 directly to minimize the system velocity error, as functionally illustrated in FIG. 2a.

In accordance with an aspect of the invention the same quantizer is utilized to establish both the position and velocity loops as illustrated in FIG. 2a where the reference numerals primed identify an element similar to the element identified by the same reference numeral, unprimed in FIG. 2.

In accordance with another aspect of the invention a servo system as represented in FIG. 2a is modified to that shown in FIG. 2b, by the provision of a second integrator 82' (servo register 82 and its associated number-to-frequency converter). In the velocity loop of FIG. 2b, the digital simulation of the required velocity change presents distinct advantages. The open loop gain of the system (velocity loop open) approaches infinity as the system's condition approaches the steady state. See FIG. 2c. Therefore in a steady state condition, a force is applied to the controlled object via the prime mover and amplifier without the necessity of having an error signal present. When $f_p$ and $f_q$ pulses are received at summing device 83' at the same rate the velocity or tracking error is zero.

Returning to FIG. 2, the pulse frequencies $f_p$, $f_q$, and $f_v = f_p - f_q$, are applied to servo amplifier 70 and summed therein in a manner hereinafter explained. The result of this summation determines the direction and magnitude of movement of the prime mover and hence the object controlled thereby. The structural details of the servo system of FIG. 2 are hereinafter described.

Circuit elements

Figure 3A:
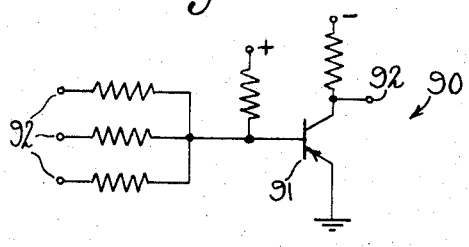
FIGS. 3a and 3b are diagrams illustrative of a logical circuit element which may be utilized in various components comprising a system embodying the invention.
Figure 3B:
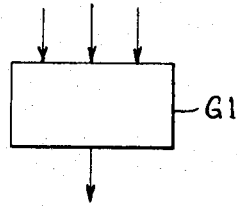

In a preferred form of the invention, as will hereinafter be described, the various components thereof are preferably constructed from the well-known NOR circuit, illustrated schematically in FIG. 3a. NOR element or circuit 90, as illustrated, comprises a PNP transistor 91, in a grounded emitter configuration, having a plurality of inputs 92 to the base thereof. As will be apparent from FIG. 3a there will be an output voltage (negative) at the collector 92 of transistor 91 whenever there is no negative input signal to the base of transistor 91. If there should be a negative input of sufficient magnitude to the base of transistor 91 the transistor will switch on and the collector will then go to ground. When transistor 91 is cut off the collector will essentially be at the supply voltage. All NOR elements hereinafter illustrated are operated in a switching mode. When transistor 91 is in a conductive state this may be considered a "0" output and when it is cut off it may be considered to have a "1" output. In the circuits hereinafter explained the NOR circuit of FIG. 3a will be illustrated as shown in FIG. 3b which is designated as gate G1. FIG. 3b illustrates the NOR element as it is used as an OR gate or merely for purposes of inversion. When the NOR element is used as an "AND" or coincidence gate a dot will be placed in the middle of the block forming gate G1. It will be apparent that the NOR element will provide a "1" output when all of the inputs thereto are "0."

The NOR elements may be utilized to provide bi-stable devices 94 as illustrated in FIG. 4a. For simplicity of illustration the bi-stable flip-flop 94 of FIG. 4a is hereinafter illustrated as shown in FIG. 4b and designated as memory M1 or as shown in FIG. 4c and designated memory M2. The operation of these bi-stable devices is well known to those skilled in the art and no description of such operation need be made here. It will be understood, of course, that the particular circuit elements here shown are set forth only to disclose a preferred embodiment of the invention. As shown in FIGS. 4b and 4c the input designated by the letter C represents a clock pulse which may be applied to either side of the flip-flop for setting or resetting. In many instances a memory or gate will be shown as having a multiplicity of inputs which could not be practically achieved in a single transistor. In such instances it will be understood that a plurality of NOR elements may be arranged in parallel to provide the necessary circuit component.

The timing of the operation and sequence of events of the interpolation and servo systems is controlled by clock pulses, C1, C2, C3 and C4 which are graphically illustrated in FIG. 5. The clock pulses vary between "0" voltage and a predetermined negative voltage hereinafter referred to as a "1" voltage level. Each clock pulse consists of a short pulse of one voltage level followed by a longer pulse of the other voltage level. The operating portion of each clock pulse is the short pulse portion. As will hereinafter be made apparent the odd clock pulses C1 and C3 are utilized primarily to reset bi-stable devices hereinafter referred to as memories, while the even clock pulses C2 and C4 are used primarily for gating purposes. Each clock cycle which consists of the four clock pulses, C1, C2, C3 and C4 is uniform in time and continuously repetitive when the system is in operation. Clock oscillator 54 is described in detail in the aforementioned copending application.

Servo system components

The components of servo system of FIG. 2 will now be described in detail sufficient to disclose the operation thereof. The details of construction vary in some respects from functional diagram of FIG. 2 and such differences will hereinafter be pointed out, if not made apparent.

Reference is now made to sample control register 78, illustrated schematically in FIG. 6. The function of sample control register 78 is to provide a plurality of gating signals $sg_1$–$sg_8$ which sequentially occur every one-half clock cycle commencing every thirty-second clock cycle and are initiated by a $bf_5$ pulse from binary frequency generator 55. Sample control register 78 also provides resetting signals $rs_1$–$rs_8$ for bi-stable elements in sample logic 77 every one-half clock cycle, commencing with every thirty-second clock cycle and initiated by a $bf_5$ pulse from binary frequency generator 55. In the illustrated embodiment, sample control register 78 comprises a plurality of pulse generating stages, three of which are illustrated in FIG. 6.

Every thirty-second clock cycle upon occurrence of $bf_5$ pulse gate G2 is enabled at C4 to provide a setting signal to memory M3. The "1" output of gate G2 also provides a resetting signal $rs_1$. When the output of gate G2 sets memory M3, the left side of memory M3 has a "0" output and one-half clock cycle later at C2 gate G3 supplies a resetting signal $rs_2$. The signal $rs_2$ also sets the left side of memory M4 which then has a "0" output and one-half clock cycle later at C4, gate G4 supplies another resetting signal $rs_3$. The output signal from gate G4 also sets memory M5. The remaining stages of the sample control register 78 are similar to stages 78a, 78b and 78c, illustrated in FIG. 6, and provided sequentially every half clock cycle resetting signals $rs_1$–$rs_8$.

Each of the stages of the sample control register also provides a sample gating signal each half clock cycle. When memory M3 of stage 78a is reset at C3 the output of the right side of memory M3 goes to "0" and is applied to an inversion gate G5 which yields a "0" gating signal except when memory M3 is reset by C3. It may thus be seen that when gate G2 sets memory M3 and provides a resetting signal $rs_1$, gate G5 will supply a "0" level gating signal $sg_1$. In a similar manner in stage 78b, gate G6 provides a "0" gating signal $sg_2$ at the same time gate G3 provides resetting signal $rs_2$. Also, stage 78c provides a gating signal $sg_3$. The gating signals $sg_1$–$sg_8$ occur sequentially every one-half clock cycle commencing every thirty-second clock cycle. The resetting signals $rs_1$–$rs_8$ and the gating signals $sg_1$–$sg_8$ are utilized as hereinafter explained.

Reference is now made to FIG. 7 which illustrates in more detail the operation of pulse adder 75, error register 76, sample logic 77, number-to-frequency converter 79 and sign logic 79a, shown in block form in FIG. 2. Error register 76 comprises a binary bi-directional counter having eight stages 76a–76h and a directional sign element or stage 76i. As illustrated, a least significant bit is held in stage 76a and the most significant bit is held in stage 76h. The bi-directional counter receives either incrementing or decrementing pulse inputs from pulse adder 75. In a preferred embodiment, as hereinafter described, pulse adder is constructed integral with stage 76a.

Every thirty-second clock cycle under the control of sample control register 78 the number held in binary form in register 76 is sampled and held in sample storage memories M6–M14 each of which store the bit of a corresponding stage 76a–76i, respectively. Memories M6–M14 are reset by the resetting signals $rs_1$–$rs_8$ derived from sample register 78, previously explained. Sample memories M6–M14 are set by the outputs of gates G8–G16, respectively, every thirty-second clock cycle when enabled by one of gating signals $sg_1$–$sg_8$ at a gating clock pulse C2 or C4. When sampling occurs every thirty-second clock cycle memories M6–M14 are sequentially reset every one-half clock cycle and then sequentially set (dependent on the presence of a bit in an associated register stage) by a signal from an associated one of gates G8–G15. In operation, upon occurrence of a $bf_5$ pulse memory M6 is reset at C4, simultaneously and $sg_1$ gating signal is applied to gate G8. However, gate G8 cannot apply a setting signal to memory M6 until C2. Memory M7 is reset at the same C2 pulse which enables gate G8. However, gate G9 cannot set memory M7 until the following C4 pulse.

As will hereinafter be explained a "borrow" or "carry" bit propagating through the stages of error register 76 propagates at a rate of one stage every half clock cycle. It may thus be seen that the sequential sampling of the stages of error register 76 occurs at the same time as the time of propagation of an increment or decrement therethrough. The function of the sample logic and sampling control is to store the information in error register 76 in a static storage at a time when no carries or borrows are propagating through the stage of the counter being sampled.

The binary number held in static storage in sample logic 77 is converted to a pulse frequency $f_p$ having a number of pulses proportional to the numerical content of the sample memories. This number-to-frequency conversion is accomplished through the provision of coincidence gates G17–G25 and binary frequency generator pulse frequencies $bf_1$, $bf_2$, $bf_3$, $bf_4$ and $bf_5$. Pulse frequency $f_p$ is actually comprised of two pulse frequency components $f_{pc}$ and $f_{pf}$. Pulse frequency $f_{pc}$ is termed the coarse position error pulse frequency, while $f_{pf}$ is termed the fine position error pulse frequency. Pulse frequency $f_{pc}$ is derived from the bits in the four higher order stages of register 76 while pulse frequency is derived from the bits in the four lower order stages. The reasons for division of pulse frequency $f_p$ into two components is hereinafter made apparent.

Let it be assumed that all of sample memories M10–M13 are set in a condition indicative of a binary "1" in counter stages 76e, 76f, 76g and 76h and that sign memory M14 is set in a condition indicating that the numeric representation in register 76 is positive. Then gates G25, G24, G23, G22 and G21 will pass frequencies $bf_1$, $bf_2$, $bf_3$, $bf_4$, and $bf_5$, respectively. These frequencies $bf_1$–$bf_5$ are then summed in an OR gate 95 to provide pulse frequency $f_{pc}$ a component of pulse frequency $f_p$. Dependent upon the commanded direction of movement, that is, positive or negative directions, a component of pulse frequency $f_{pc}$ will pass through one of gates G28 or G29 to an appropriate input of servo register 82, or more specifically, pulse adder 83. If the number held in counter 76 is positive, memory M14 will be set in a state indicative thereof and will enable gate G25 to pass the highest order frequency $bf_1$ which occurs every other clock cycle. Therefore, when the sampled content of error register 76 is positive, pulse frequency $bf_1$ will be present in the output of OR gate G27. However, when the sign logic stage 76i is sampled and it is determined that the numerical content of error register 76 is negative then memory M14 will inhibit gate G25 and pulse frequency $bf_1$ will not be present in the output of OR gate G27.

It is the presence or absence of pulse frequency $bf_1$, which occurs every other clock cycle, in the output of OR gate G27 which indicates the algebraic sign of the numerical content of error register 76. The pulse output $f_{pc}$ of OR gate 95 is applied to coincidence gates G28 and G29 which are selectively enabled by sign memory M14 dependent upon the state thereof which in turn is dependent upon the information received from sign logic stage 76i of error register 76. The pulse frequency $f_{pc}$ is applied directly to servo amplifier 70 through a pulse shaper. Also, pulse frequency $f_{pc}$ is applied to gates G28 and G29 prior to application to servo register 82. As will hereinafter be explained, the frequency component $bf_1$ is removed from the pulse frequency outputs of gates G28 and G29 which are designated $+f'_{pc}$ and $-f'_{pc}$, respectively.

OR gate 96 provides an output pulse frequency $f_{pf}$ which is designated the fine position error frequency output. Frequency $f_{pf}$ is a summation of the pulses received through gates G17, G18, G19 and G20 which are enabled by sample memories M6, M7, M8 and M9, respectively. Gates G17, G18, G19 and G20 when enabled pass pulse frequencies $bf_5$, $bf_4$, $bf_3$ and $bf_2$, respectively. From a pulse rate standpoint in relation to the significance of the binary digits in stages 76a, 76b, 76c and 76d of error register 76 the fine pulse frequency $f_{pf}$ is increased by a factor of sixteen.

The purpose of raising the frequency of the fine pulses $f_{pf}$ by $2^4$ is to decrease the spacing between pulses of the resultant $f_{pf}$ pulse frequency from gate 96 when this pulse frequency is applied to the servo amplifier. This increase in the frequency of the $f_{pf}$ pulses is subject to later compensation as hereinafter described.

From the foregoing discussion it is apparent that the numerical content of error register 76 is converted into a pulse train having a number of pulses proportional to the number held in error register 76 in binary form.

Reviewing briefly, the function of error register 76 is to integrate the velocity error which is a pulse frequency $f_z - f_q$. The result of this integration is the numerical count in the register which is the difference between commanded position and actual position. The total number of pulses produced from OR gates 95 and 96 are proportional to this magnitude of the error. Incrementing or decrementing pulses from pulse adder 75 are introduced only into the least significant bit stage of the error register, carries or borrows are propagated to the adder in a manner known in the operation of a bi-directional counter. As will hereinafter be explained in more detail sign logic stage 76i comprises a bi-stable or memory device which is normally set to indicate a positive count in the error register. However, when the numerical content of the register is representative of a negative error, a borrow is propagated along the stages of the error register which sets the sign memory to a state indicative of a negative error. The sign logic stage 76i will then cause gate G25 to be inhibited and pulse frequency $bf_1$ will not be present in the output of gate G27. To illustrate the manner in which the presence or absence of pulse frequency $bf_1$ determines the direction of the error, reference is made to Table II.

TABLE II

| Error register content | Arabic | Binary | $f_{pc}/512$ clock cycles |
|---|---|---|---|
| Condition 1 | 0 | 00000000 | $bf_1 = 256$ |
| Condition 2 | 176 | 10110000 | $bf_1 + (bf_2 + bf_4 + bf_5) = 432$ |
| Condition 3 | −176 | 1−01010000 (complemented) | $bf_3 + bf_5 = 80$ |

At Condition 1 the numerical error in register 76 is zero. Under such conditions sample sign memory M14 will be set to show a positive mode of operation and pulse frequency $bf_1$ will be gated to OR gate 95 through coincidence gate G25 every other clock cycle at C4. Pulse frequency $f_{pc}$ will then consist solely of pulse frequency $bf_1$ and will be applied to servo amplifier 70 through pulse shaper 81, FIG. 2. Assume now that a positive error of one hundred seventy-six exists at Condition 2. Under such conditions stages 76e, 76f, and 76h of error register 76 will be set to denote a binary "1" and sign logic stage 76i will be set to denote a positive error. Therefore, the output of OR gate 95 will be the sum of $bf_1 + (bf_2 + bf_4 + bf_5)$ or four hundred thirty-two pulses in a time of five hundred twelve clock cycles. The difference here between the output of OR gate 96 which is $f_{pc}$ and $bf_1$ is one hundred seventy-six pulses.

Now assume the error register 76 returns to a numerical content of zero and decrementing pulses are applied thereto until the numerical error denoted therein is minus one hundred seventy-six. By virtue of inherent construction of a binary bi-directional counter as will hereinafter be exemplified, this minus error will be denoted as the complement of an identical positive error and error register stages 76e and 76g will be set to denote the presence of a binary "1." However, in establishing this binary representation of a negative error a "borrow" has propagated to sign logic stage 76i, which through gate G16 at the next sampling time sets sample sign memory M14 in a state indicative of a negative error. The output of the left side of memory M14 will then inhibit gate G25 and prevent passage of pulse frequency $bf_1$ therethrough. Therefore, the output of $f_{pc}$ of OR gate 95 will be the sum of $bf_3$ plus $bf_5$ passed through gates G21 and G23. In this instance the $f_{pc}$ pulses from OR gate 95 will total eighty in a time of five hundred twelve clock cycles. From an inspection of Table II it will be noted that $f_{pc}$ pulses for a given positive numerical error will bear a similar absolute relationship to pulse frequency $bf_1$ as the same negative numerical error. In the example given, the $f_{pc}$ pulses produced by the number one hundred seventy-six in the error register total 176 greater than $bf_1$ in the stated number of clock cycles. When the error is negative, the $f_{pc}$ pulses are one hundred seventy-six less than the $bf_1$ pulses in the stated number of clock cycles.

The presence of absence of pulse frequency $bf_1$ in pulse frequency $f_p$ thus establishes the sign of the numerical representation of the position error in error register 76. At this point it is apparent that the summation of the position command pulses $f_z$ and the actual position pulses $f_q$ in error register 76 comprises an integration of the velocity error. The subsequent conversion of the position error number in register 76 to a pulse frequency $f_p$ provides a pulse frequency representing a velocity error proportional to the position error. This velocity signal is then utilized as will hereinafter be explained.

Reference is now made to FIG. 8 which illustrates schematically the first stage 76a of the bi-directional counter forming error register 76, including pulse adder 75.

Stage 76a is arranged to receive four pulse inputs $f_z$, $f_q$, $-f_z$, and $f_q$ pulses. Stage 76a generally comprises an incrementing portion shown above the broken line and a decrementing portion shown below the broken line. The elements of the two portions are substantially identical in construction and function and elements in the decrementing portion corresponding to those of the incrementing portion bear the same identifying reference numeral primed.

In the incrementing portion $f_z$ command pulses are applied to memory M16 and $-f_q$ pulses are applied to memory M17. If an $f_z$ and a $-f_q$ pulse are both received in the same clock cycle, gate G33 senses this simultaneously receipt and then sets memory M19. When memory M19 is set it indicates that two incrementing pulses have been received during the same clock cycle and therefore a carry pulse must be forwarded to the next stage of the counter. Gate G34 senses the set condition of memory M19 and forwards the carry pulse to stage 76b. When gate G33 senses that two incrementing pulses have been received during the same clock cycle it also resets memory M18. Memory M18 is referred to as the incrementing memory of stage 76a. Memory M18 is set every clock cycle at C1 to a state indicative of the presence of an incrementing input. However, if there has been no incrementing input at C2 it is reset by gate G32. Gate G32 senses when there has been no incrementing input to either memory M16 or M17 and resets memory M18 in response thereto. If memory M18 is not reset at C2 it is indicative of the fact that a single incrementing pulse has been received by either M16 or M17.

Memory M20 functions to hold an error bit which is presently in the stage for one-half of a clock cycle. If an error bit is presently in the stage as indicated by a set condition of memory M20 and memory M18 is set to a condition indicative of receipt of one incrementing pulse, gate G35 senses the contents of memory M18 and M20 and in response thereto forwards an incrementing pulse to the incrementing memory of next higher order stage 76b. At the same time the output of gate G35 resets memory M20' which is the complement of memory M20. Memory M20' holds an error bit presently in the stage during the second or decrementing half of a clock cycle. If gate G35 resets memory M20' it is indicative of the fact that the contents of memory M18 and memory M20 have been added to produce a carry bit to the next stage and no sum bit remains. Gate G36 senses the condition existing when there is no incrementing bit in memory M18 and when no error bit is present in memory M20 thus indicating there is no bit, either incrementing or present error, in the incrementing portion of stage 76a. When gate G36 senses the absence of an increment and an error bit, it resets memory M20'.

Reference is now made to the decrementing portion of the stage. Decrementing pulses $-f_z$ or $f_q$ are applied to memories M16' and M17', respectively. The condition or stage of memories M16' and M17' is sensed by gates G32' and G33'. However, a delay network comprising memories M21 and M22 and associated gates G37 and G38, respectively, are interposed therebetween to provide a one-half clock cycle delay. When both a $-f_z$ and a $+f_q$ pulse are received during the same clock cycle, memories M21 and M22 will set to a state indicative of such receipt at C2. At C4, gate G33 will sense the receipt of two decrementing pulses and set memory M19' in response thereto. Then on the following C2 pulse, gate G34 will forward a decrement or "borrow" to the decrement memory of the next higher order stage 76b. Memory M18' is the decrementing memory of stage 76a. At clock pulse C3 memory M18 is set to a state indicative of receipt of one decrementing input. On the following C4 clock pulse, memory M18' is reset by gate G33', if two decrementing pulses have been received or by gate G32' if no decrementing pulses have been received. If a single decrementing pulse, either $f_q$ or $-f_z$ is received gate G32' is inhibited and memory M18' is not reset.

As previously stated memory M20' holds an error bit presently in the stage, if in the stage, during the decrementing one-half of a clock cycle. Memory M20' is set every clock cycle at C3 to a state indicative of the existence of an error bit in the stage and remains in that condition unless reset by one of gates G35 or G36 on the following C4 clock pulse. Assume that memory M20' was not previously reset by gates G35 and G36. This indicates that an error bit is held in memory M20'. Further assume that memory M18' has been reset thus indicating that there is no decrement stored therein. Under such conditions, gate G35' will be inhibited. However, gate G36' will sense the error bit held in memory M20' and further sense that memory M18' holds no error bit. Upon sensing these conditions gate G36' will apply a signal to memory M20 to set it in a state indicative of an error bit presently in the stage. Assume during the next clock cycle memory M18 is set to a condition indicative of receipt of one incrementing input, gate G35 will sense the present error in memory M20 and the incrementing input in memory M18 and in response thereto will forward a "carry" or incrementing pulse to the incrementing memory M23 of stage 76b. At the same time gate G35 at C4 resets memory M20' to a state which indicates that there is no error presently in the stage.

At this time assume that a decrementing input is received by stage 76a. At clock pulse C3 memory M18' will be set indicating that a decrementing pulse is present. Due to the fact that a decrementing pulse has been received neither gate G32' nor gate G33' will reset memory M18'. Therefore, the binary "1" bit in memory M18' must be subtracted from the "0" in memory M20. It is known from the rules of binary arithmetic that the result of such subtraction will be retention of an error bit in stage 76a and a decrement or "borrow" pulse to stage 76b. Gate G35' senses that memory M20' is in a reset or "0" condition and that memory M18' is in a set or "1" condition and in response thereto will forward a borrow pulse to decrement memory M24 of stage 76b, and simultaneously set memory M20 to a state indicative of a present error bit of "1."

From the foregoing the operation of stage 76a which includes the function of pulse addition is now apparent. The summing function of stage 76a effectively produces a pulse frequency $f_z - f_q$ which represents a system velocity error.

Attention is invited to the fact that the quantizer pulses applied to servo register 82 and also those applied directly to servo amplifier 70 are taken from stage 76a of error register 76. Negative $f_q$ pulses derived from the left side of memory M17 every time memory M17 is reset and positive $f_q$ pulses derived from memory M22 each time a $f_q$ pulse is applied to memory M17' are applied directly to servo amplifier 70 as hereinafter explained. Negative $f_q$ incrementing pulses are applied to servo register at C2 responsive to receipt from $-f_q$ pulses by memory M17. Positive $f_q$ pulses are applied to servo register 82 at clock pulse C2 from gate G38 which senses whenever memory M17' is set by a positive $f_q$ pulse.

FIG. 8 also illustrates a portion of the sample logic circuit 77. When sample gating signal $sg_1$ is received, sample gate G8 is enabled at C2 to sense an error bit in memory M20'. If gate G8 is enabled it applies a setting signal to memory M6, FIG. 7.

Reference is now made to FIG. 9 which illustrates the second stage 76b of error register 76. Stage 76b comprises four memories M23, M24, M25 and M26 and gates G39, G40, G41, G42. Memory M23 is the increment memory of stage 76b and receives incrementing pulses from either of gates G35 or G36 of stage 76a. Memory M24 is the decrement memory of stage 76b and receives decrementing or borrow pulses from gate G35' or gate G36' of stage 76a. Memories M25 and M26 ultimately hold the error bit presently in stage 76b for a half clock cycle each. Gates G39 and G40 at clock pulse C2 will add the contents of memory M25 and any carry bit received by memory M23. If memory M25 presently contains an error bit and a carry signal is received by memory M23 gate G38 will forward a carry pulse to stage 76c. Assuming that there is an error bit stored in memory M25 and no carry is received by memory M23 at clock C2 gate G40 will transfer the bit in memory M25 to memory M26. Gates G41 and G42 will then subtract a borrow bit in memory M24, if present, from the error bit in memory M26. If a borrow bit is present in memory M24, gate G41 would then forward a borrow to stage 76c and simultaneously reset memory M25. If no borrow has been received from stage 76a and memory M24 does not receive a decrementing pulse from gate G35' or G36' gate G40 will transfer at clock C4 the error bit, if present, in memory M26 back to memory M25.

At C4 when sample gate signal $sg_2$ is present the contents of memory M26 is sampled to determine if an error bit is present in stage 76b. If upon occurrence of sampling gate signal $sg_2$, gate G9 senses the existence of an error bit in memory M26, gate G9 sets sample memory M7. When sample memory M7 is set it enables gate G18 at clock pulse C4 to pass a $bf_4$ pulse to fine error "OR" gate 96, previously illustrated in FIG. 7.

Stages 76c–76h of error register 76 are the same as disclosed in FIG. 9 as are the sample gating and logic circuits associated therewith. For further clarity of disclosure stage 76h, the most significant bit position of register 76 and sign logic stage 76i will now be described in conjunction with FIG. 10.

Stage 76h comprises an increment memory M27 which receives a carry pulse, if present, from stage 76g, a decrement memory M28 which receives a borrow pulse, if present, from stage 76g, error bit storage memories M29 and M30, a pair of add gates G42 and G43 and a pair of subtract gates G44 and G45.

Associated with stage 76h is sample memory M13 which is reset from sample control register 78 by reset signal $rs_8$ and then set by a following sample gating signal $sg_8$ from gate G15 if gate G15 senses a binary "1" error bit in memory M30. If memory M13 is set by sample G15 it will enable gate G24 to pass $bf_2$ pulses to OR gate 95.

Sign logic stage 76i comprises a sign memory M31 which is set by gate G42 to indicate that the error in error register 76 is positive and is reset from gate G45 to indicate that the numerical error in error register 76 is negative. A delay circuit comprising memory M32 and gate G46 is inteposed between gate G45 and memory M31 to delay a borrow signal one-half clock cycle so that a borrow to memory M31 does not occur during a sampling function. Memory M31 is normally set. To explain the manner in which memory M31 is reset to indicate a numerical negative error in register 76, assume that a borrow from stage 76g sets memory M28 and the contents of memory M28 must be subtracted from memory M30 which contains a binary "0." In binary subtraction it will be recalled that when "1" is subtracted from "0" the result is a binary "1" with a borrow from the next higher order stage. If memory M30 contains a binary "0" all of the inputs to gate G45 at C4 will be "0," the output of gate G45 will be "1." This sets delay memory M32 and at C2 delay gate G46 will reset memory M31 if memory M27 has not received a carry from stage 76g. Memory M31 will now be in a state indicative of a negative numerical error in error register 76. Sample gate G16 will then be enabled by sample gating signal $sg_8$ to set sample sign memory M14 to a state indicative of a negative numerical error in error register 76. The outputs of memory M14 will then inhibit gate G28 and enable gate G29. Therefore, the output pulse frequency $f_{pc}$ from OR gate 95 appears on the minus or negative output line. The output of the left side of memory M14 which is a "1" will also inhibit gate G25 and prevent inclusion of pulse frequency $bf_1$ in the output pulse frequency $f_{pc}$.

If memory M31 should be set to indicate a positive error sample gate G16 could not set memory M14 and the "1" output of the right side of memory M14 would inhibit gate G29. Also, the left side of memory M14 would then enable gate G25 and allow the application of pulse frequency $bf_1$ to OR gate 95 which is comprised of a memory M33 having as its inputs pulse frequencies $bf_1$, $bf_2$, $bf_3$, $bf_4$ and $bf_5$, from gates G25, G24, G23, G22, and G21, respectively.

The output of the left side of memory M33 is applied to gate G28. For gate G28 to be enabled it must sense from memory M14 that a positive numerical error exists in error register 76, memory M33 is set, a signal $bf_1'$ is present, and clock pulse C2 occurs. The signal $bf_1'$ is derived from $bf_1$ and occurs in between occurrence of $bf_1$ pulses. As will be apparent this signal $bf_1'$ may be obtained by delaying a $bf_1$ signal for one-half clock cycle, it being understood that $bf_1$ occurs every other clock cycle.

The pulse outputs of gates G28 and G29 are applied to incrementing and decrementing inputs of servo register 82 as will hereinafter be described. It is apparent that the presence of the $bf_1$ signal in the output taken directly from memory M33 at line L10 indicates the sign of the error. However, it is not desired to have the $bf_1$ component present in the output of gates G28 and G29. The pulse frequency $bf_1'$ effectively subtracts $bf_1$ from the output of OR gate 95 by opening gates G28 and G29 only every other clock cycle when M33 has not been influenced by $bf_1$.

It is readily apparent when the numerical error in register 76 is positive that gate G28 will be enabled each time a $bf_2$, $bf_3$, $bf_4$ or $bf_5$ pulse sets memory M33. This is seen from consideration of Table II where there was a positive error of one hundred seventy-six. In this case one hundred seventy-six pulses are passed by gate G28 in five hundred twelve clock cycles.

However, when the error is negative only $bf_3$ and $bf_5$ pulses (eighty) are applied to memory M33 during five hundred twelve clock cycles. For a true pulse representation of the same numerical error one hundred seventy-six pulses must be passed or produced by gate G29. Gate G29 will produce the required one hundred seventy-six pulses as now explained.

Memory M33 is reset every clock cycle at C3. Therefore, in the five hundred twelve clock cycles memory M33 could potentially enable gate G29 every clock cycle. But $bf_1'$ inhibits gate G29 every other clock cycle so memory M33 can only enable gate G29 two hundred fifty-six times. However, memory M33 in this time will be set eighty times at C4 upon receipt of $bf_3$ and $bf_5$ pulses. When memory M33 is set at C4 there is only a "0" input to the right side thereof and the output of the right side thereof has a "1" output at the following C2 pulse which inhibits gate G29. Therefore, pulse frequency $-f_{pc}'$ will have a number of pulses (one hundred seventy-six) equal to the negative numerical error in register 76.

The pulse outputs $f_{pc}'$ and $-f_{pc}'$ of gates G28 and G29 are applied to the least significant bit stage of servo register 82, FIG. 11, as are positive and negative $f_q$ pulses. The fine error output pulses $f_{pf}$ which have been raised in quantity by a factor of sixteen are applied to a four-stage uni-directional pulse counter 98. Therefore, when counter 98 receives sixteen fine error pulses $f_{pf}$ it will apply one incrementing pulse to input stage 82a of servo register 82. This input pulse from counter 98 has the same effect as a positive coarse error pulse $f_{pc}$. Servo register 82 is constructed in the same manner as error register 76 and comprises eight numerical stages, 82a–82h plus a sign logic stage 82i.

The structure of servo register 82, sample logic 84 and number-to-frequency converter 85 as shown in FIG. 11 is seen to be substantially identical to servo register 76, sample logic 77 and number-to-frequency converter 79 shown in FIG. 7. In sample logic gates G48–G56 are provided to sample the contents of servo register stages 82a–82i, respectively, every thirty-two clock cycles. When any of the gates G48–G56 sense that an associated stage of error register 82 contains a binary "1" digit it sets an associated memory M35–M43. If the memories M35–M43 are set they enable gates G57–G65, respectively, to pass selected ones of $bf_1$–$bf_5$ pulses.

Pulse frequencies $bf_1$–$bf_5$ passed by gates G61–G65 are summed in an OR gate 99. The presence of pulse frequency $bf_1$ in this summation determines the algebraic sign of the numerical content of register 83 in the same manner as explained in conjunction with error register 76. The output of OR gate 99 is termed the coarse error servo register pulses $f_{vc}$. OR gate 100 sums the output pulses of gates G57, G58, G59, G60, G66 and G67, the last two mentioned gates being enabled by the presence of a binary "1" digit in the last two stages of uni-directional counter 98. It will be noted that the application of pulse frequencies $bf_1$–$bf_4$ to gates G60, G59, G58, G57, respectively, effectively increases the weight of the fine error pulses $f_{vf}$ from OR gate 100 by a factor of $2^5$. The weight of the pulse frequency $f_{pf}$ will subsequently be diminished by a like factor as will hereinafter be explained.

*Servo amplifier*

As thus far explained, eight pulse frequencies or trains have been derived in the servo system. These eight pulse frequencies are $+f_q$; $-f_q$; $f_{pf}$, the fine error pulses from number-to-frequency converter 79; $f_{pc}$, the coarse error pulses from number-to-frequency converter 79; $f_{pc}'$ and $-f_{pc}'$, the pulses representing the numerical content of error register 76; $f_{vc}$, the coarse error pulses and $f_{vf}$ the fine error pulses from number-to-frequency converter 85. These pulse frequencies, except $f_{pc}'$ and $-f_{pc}'$, are applied to identical pulse shapers 102, 103, 104, 105 and 88 which in the disclosed embodiment of the invention are part of servo amplifier 70, FIG. 12. The pulse shapers 102–105 and 88 are identical and function to shape the pulses received thereby into corresponding pulses of constant amplitude and pulse width. The details of one of the pulse shapers identified as pulse shaper 103 is shown in FIG. 13 and will hereinafter be described.

In FIG. 12 pulse shapers 102 and 103 correspond to pulse shaper 81 and pulse shapers 104 and 105 correspond to pulse shaper 86 of FIG. 2.

Pulse shaper 103, FIG. 13 will first be described. It comprises a transistor 107 connected between ground and a bus line 108, and a transistor 109 connected between bus lines 110 and 111. The potential of bus lines 108, 110, 111 and also 112 are set forth solely to enhance explanation of operation of the circuit. Resistors 113 and 114 which are of equal resistance value are in the collector circuit of transistor 107, and resistors 115 and 116 which also are of equal resistance values are in the collector circuit of transistor 109. A diode 117 is connected between the collector of transistor 109 and bus line 112 to clamp the collector of transistor 109 to a voltage value of no greater than 6.5 volts.

The pulse output $f_{pc}$ of memory M33, FIG. 10, is applied to the base of transistor 107 through terminal 119 and resistor 120. C3 clock pulses are applied to the base of transistor 107 through terminal 118 and resistors 121 and 122.

The sum of the value of resistors 121 and 122 is essentially double the resistance value of resistor 120. Resistor 123 is substantially greater in value than the sum of resistors 121 and 122. Resistors 123 and 126 are provided to back bias transistors 107 and 109, respectively. Capacitor 124 is provided to enhance the switching time of transistor 107 upon receipt of a C3 pulse. Capacitor 125 is provided to enhance the switching time of transistor 109. The voltage output from pulse shaper 103 is taken from point 127 between resistors 115 and 116 and is applied to point 161 of potentiometer 129, FIG. 12.

It may readily be noted that when transistor 109 is turned off the voltage at point 127 will be 10.25 volts. However, when transistor 109 is turned on the voltage at point 127 will be 4.0 volts. Transistor 109 is turned on when the voltage on the base thereof moves a sufficient distance in a positive direction. Transistor 109 may normally be considered to be turned off because of the negative bias thereon from resistor 126. When transistor 107 is turned on the voltage at the base of transistor 109 rises toward ground and transistor 109 switches on.

Transistor 107 will be turned on upon receipt of either a C3 clock pulse at terminal 118 which drops the potential at terminal 118 from "0" to —14 volts, or absence of an $f_{pc}$ pulse from memory M33 which raises the potential at terminal 119 to ground from —14 volts. It will be recalled that the $bf_1$–$bf_5$ pulses which set memory M33, FIG. 10, occur at a C4 pulse and the left side of memory M33 will have a "0" output until the following C3 clock pulse resets memory M33. In practice, the C4 pulses occur just prior to the end of a C3 pulse so there is a slight overlap therebetween.

The operation of pulse shaper 103 will be explained with reference to FIG. 14 which illustrates various pulse waveforms applied to terminals 118 and 119 of pulse shaper 103 and also waveforms appearing at point 127 under various operating conditions of the system. In FIG. 14, the pulse waveforms are shown as occurring in successive clock cycles CC1–CC5.

When transistor 107 is turned on the voltage of the collector thereof and also point 124a rises toward ground. This switches transistor 109 on and current flows from bus line 111 to bus line 110 producing a voltage with respect to ground of 4.0 volts at point 127. Transistor 107 will turn on if either of terminals 118 or 119 goes sufficiently negative. This may occur upon occurrence of a C3 pulse as shown in FIG. 14a, or when the output voltage of memory M33 is negative as shown in FIG. 14b. In FIG. 14a, C3 pulses are shown for each of successive clock cycles CC1–CC5. A C3 clock pulse has a duration of approximately five microseconds during a clock cycle of approximately twenty-five microseconds. A C4 clock pulse has a duration of approximately seven and one-half microseconds.

The voltage at terminal 118 due to C3 pulses will appear as shown in FIG. 14a, and when there is zero error in register 76 the voltage input to terminal 119 will appear as shown in FIG. 14b. In considering FIG. 14b and also memory M33, FIG. 10 it will be apparent under zero error conditions that a $bf_1$ pulse will set memory M33 every other clock cycle at C4 at which time the left side of memory M33 will have a "0" output until memory M33 is reset by the following C3 pulse. This will cause a voltage waveform as shown in FIG. 14c to be present at point 127. When transistor 107 and also transistor 109 are turned on the voltage at point 127 is 4.0 volts. However, when transistor 107 and transistor 109 are not turned on the voltage at point 127 will be 10.25 volts.

Assume now that the numerical error in register 76 is greater than zero and memory M33 produces an output pulse following the C3 pulse of clock cycle CC2, FIG. 14. The waveform of the voltage applied to terminal 119 will now appear as shown in FIG. 14d which will result in a voltage waveform at point 127 as shown in FIG. 14e.

Let it now be assumed that the numerical error in register 76 is negative or less than zero. As previously explained, there will be no $bf_1$ pulse component in the output of memory M33. If it is assumed that the error pulse under the conditions assumed appears immediately following the C3 pulse of clock cycle CC4, the voltage waveform at terminal 119 will appear as shown in FIG. 14f and the resulting voltage waveform at point 127 will appear as shown in FIG. 14g.

Referring back to FIG. 12, all of the shaped pulses except the quantizer pulses are combined by a summing device which is shown as a potentiometer 129.

The quantizer pulses $f_q$ and $-f_q$ from memories M22 and M17, FIG. 8, are applied to pulse shaper 88 through a directional logic network 128. Network 128 comprises a memory M49 and gates G68 and G69. Memory M49 applies a "0" or "1" level signal to pulse shaper 88 dependent upon the direction of motion of a controlled object with respect to its reference path. The resulting voltage waveform of pulse shaper 88 determines the voltage across potentiometer 156.

To examine the operation of network 128 assume that the controlled object is moving in a positive direction with respect to its reference path. Then $f_q$ pulses are applied to the right side of memory M17' (at C4 as hereinafter explained). In response to $f_q$ pulses memory M22 is set at C2 through gate G38. The output of the left side of memory M22 then holds gate G68, FIG. 12, closed and a "0" signal is applied to the left side of memory M49.

At the same time memory M17 remains in a reset condition under the influence of C3 pulses since no $-f_q$ pulses are received. The input to gate G69 from memory M17 is "0" and at C2 gate G69 will set memory M49. Then memory M49 will apply a "0" level signal to pulse shaped 88, and a "0" signal to the left side of memory M49. Thus, memory M49 will remain in a set state until $-f_q$ pulses are applied to memory M17.

Assume now that the direction of travel of the controlled object is reversed, then $-f_q$ pulses are applied to memory M17 at C4. This causes the left side of memory M17 to apply a "1" signal to gate G69. Gate G69 will no longer apply a setting signal to memory M49.

Positive $f_q$ pulses are no longer applied to memory M17', thus gate G38 has a "0" output and memory M22 applies a "0" signal to gate G68. Then at the following C4 pulse gate G68 resets memory M49 and memory M49 applies a "1" signal to pulse shaper 88.

Thus, when the direction of travel of the controlled object is positive with respect to its path of travel, memory M49 will apply a "0" signal to pulse shaper 88 and when the direction of travel is negative M49 will apply a "1" signal to pulse shaper 88. The structure and operation of pulse shaper 88 will be apparent from the discussion of pulse shaper 103.

The output of potentiometer 129 is utilized to control the conduction of transistors 130 and 131. Transistors 130 and 131 are each in series with a coil 132 and 133, respectively, of a four-way hydraulic servo valve generally designated as 134. Coils 132 and 133 are differentially wound and dependent upon the net current therethrough determine the magnitude of and direction of displacement of a solenoid plunger which determines the direction and magnitude of rotation of the shaft of a hydraulic motor 135. This arrangement is functionally illustrated in FIG. 15.

Transistors 130 and 131 function as amplifiers or variable resistors to control the net current $(i_1-i_2)$ through the differentially wound solenoid valve coils 132 and 133. Under balanced conditions, that is, when there is no error inputs to potentiometer 129 from the pulse shapers, $i_1=i_2$ and there is no movement of the hydraulic motor 135. In series with each of transistors 130 and 131 are resistors 136, 137 and 138, 139, respectively. The resistance values of resistors 137 and 139 are equal as are the resistance values of resistors 136 and 138. A resistor 140, common to both transistor circuits, is connected between bus line 111 and point 141. The value of resistance 140 is so chosen in relation to the voltage drop thereacross (approximately 7.5 volts) that the current I therethrough is essentially constant. Therefore, the sum of currents $i_1$ and $i_2$ is constant and a decrease in one of currents $i_1$ or $i_2$ results in an increase in the magnitude of the other. The base of transistor 130 is connected to the emitter of a transistor 142 and the base of transistor 131 is connected to the emitter of a transistor 143. In series with transistor 142 are resistors 144 and 145 and in series with transistor 143 are resistors 146 and 147. The resistance values of resistors 145 and 147 are equal, and the resistance values of resistors 144 and 146 are equal.

As thus far described it may be seen that the electronic portion of servo amplifier 70 is in a balanced push-pull arrangement. The bias on the base of transistor 143 is set by potentiometer 148. A dither signal DS is applied across potentiometer 148a to transistor 143 to overcome any magnetic hysteresis of the servo solenoid valve. Dither signal DS is of a relatively low frequency which the controlled member cannot follow.

Capacitors 149 and 150 are provided to prevent any step change in current through the solenoid coils 132 and 133 which would result in non-linearity, and diodes 151 and 152 clamp any voltage spikes which might be generated by the self inductance of coils 132 and 133 to a predetermined level. A milliameter 153 is connected between coils 132 and 133 to detect any imbalance in current therethrough when the amplifier is adjusted for zero error. A Zener diode 154 is connected between lines 111 and 110 to regulate the voltage therebetween.

In initially adjusting the system, signals indicative of constant velocity operation are applied to the system as from a prepared tape to cause the controlled member to move at a high speed. Then the setting of the arm of potentiometer 155 is adjusted to give the optimum response. The position of the arm of potentiometer 156 is then adjusted to further optimize the velocity response. Then the arm of potentiometer 129 is adjusted to provide the desired loop gain of the outer or position loop.

The shaped pulses of pulse frequency $f_{pf}$ are applied to one end of potentiometer 129 through a resistance circuit comprising resistor 157 and potentiometer 158, which decreases the amplitude of these pulses by a factor of sixteen. The shaped pulses of pulse frequency $f_{vf}$ are applied to the other end of potentiometer 129 through a resistance circuit comprising resistor 159 and potentiometer 160 which decreases the amplitude of the $f_{vf}$ pulses by a factor of thirty-two. This decrease in the amplitude of the $f_{pf}$ and $f_{vf}$ pulses compensates for the increased weight previously given in the error register and servo register, respectively.

The shaped $f_{pc}$ pulses and the shaped $f_{vc}$ pulses are also applied to opposite ends of potentiometer 129. The operation of servo amplifier 70 will now be considered. When point 127 of the pulse shapers, FIG. 13 is at 10.25 volts current will flow from the pulse shapers to line 112 through potentiometer 155. Under neutral conditions the $bf_1$ pulse component of $f_{pc}$ and $f_{vc}$ will occur every other clock cycle and the voltage and point 127 of pulse shapers 103 and 104 will fall to 4.0 volts. At this time current will flow from line 112 to points 127 of the pulse shapers. Inasmuch as the amplifier is set for this neutral condition no unbalance in $i_1$ and $i_2$ will occur and there will be no movement of the controlled member.

However, if a numerical representation of an error should now occur in the servo and error registers indicating that the controlled member is to move in a positive direction with respect to its path of movement, positive going 10.25 volt pulses (FIG 14d) occur more often than every other clock cycle. This will increase the average voltage at the arm of potentiometer and decrease the conductivity of transistor 142. This results in an increase in the voltage at the emitter of transistor 142 and the base of transistor 130. Current $i_1$ then decreases and current $i_2$ correspondingly increases. Servo valve 134 will then actuate hydraulic motor 135 to drive the controlled object in its positive direction. If the numerical representation in the error register and servo register should be negative the operation of servo amplifier 70 will be the reverse of that described.

The servo valve coils and the hydraulic motor are responsive to the area under the total pulses applied to potentiometer 129 and not to a representative voltage level. In fact the waveform applied to the servo valve coils may be quite irregular. The only requirement in this respect is that the frequency of the pulses applied to the amplifier be sufficiently high that the prime mover does not follow variations in frequency. In view of this, the reason for increasing the number of fine error pulses from the error and servo registers is apparent.

A suitable servo valve is a four-way proportional valve manufactured by Moog Servo Controls, Inc., of East Aurora, N.Y., identified as model No. 73–138 A. A suitable reversible hydraulic motor identified by the reference numeral 135, FIG. 15, is a reversible hydraulic motor manufactured by Vickers, Inc., of Detroit, Mich., part No. NF 953911307. Other suitable servo valves and hydraulic motors are available and are known to those skilled in the art. The drive portion of the servo system could be comprised of electrical components as well as hydraulic components.

In servo control systems as disclosed here where a number of variables or coordinates must be controlled simultaneously, the necessity for maintaining a consistent time lag between the commanded position and the actual position of the controlled part, from axis to axis, is well appreciated. The ability to control the position loop gain which affects transient response, without affecting the velocity lag constant is extremely valuable in optimizing system performance.

As previously described, a portion of the integrated velocity error signal $f_p$ is applied directly to the servo amplifier without passing through the second integrator. In a servo system having two variables to control as is the case in the disclosed system where both position and velocity of the controlled part must be controlled, the position loop gain determines the steady state lag, that is, the difference in the commanded position and the actual position under steady state conditions. This lag is a rigid function of velocity in order to keep the tracking error zero. Where more than one axes of motion is involved as in the disclosed system it is very important to keep the position lag proportional to velocity with respect to all axes. As shown in FIG. 12, means (potentiometer 155) are provided to adjust and set the velocity loop gain without affecting the position loop gain. Other means (potentiometer 129) are further effective to then adjust the position loop gain without affecting the velocity loop gain. This is a very important feature, inasmuch as the lag constant which determines the tracking error and the velocity constant present opposing requirements.

Considering potentiometer 129, let it be assumed that the total potentiometer has a resistance value or voltage value thereacross of one. Then the portion between the arm of potentiometer 129 and terminal 161 may be designated C and the portion thereof between terminal 162 and arm 130 may be designated 1–C. Now as C approaches zero the inner or velocity loop of the system is opened and the system approaches one of the first order. Values of C greater than zero, but less than one, produce variable values of position loop gain without affecting the velocity lag constant. When C is equal to one the system becomes a normal second order system with an open loop position gain equal to the forward gain of the system. This feature allowing adjustment of the servo system position loop gain without affecting the velocity gain constant, while disclosed herein, is the invention of Johann F. Reuteler, and is claimed in copending application Ser. No. 349,216 filed on the same date and assigned to the same assignee as this application.

Automatic velocity limiting

In continuously controlled positioning servo systems such as contouring controls as described herein, it is usually the prime mover which determines the maximum velocity of each controlled member. If a programmed velocity is higher than this maximum the controlled member will lag behind the commanded position, causing an incorrect relation between the various controlled members and eventual loss of synchronization. Previously known numerical contouring controls include means for detecting this condition and causing a shutdown of the system when this occurs. This produces a limitation on the system in that the feedrate must be programmed such that the workrate of the controlled members stays safely below the capability of the servo system. The result of such limitations is that the full capabilities of the servo system are essentially never fully used.

The present invention provides means to cause automatic override of the controlled velocity to prevent excessive error in the servo system and result of loss of synchronization.

Means are provided to sense when the error expressed as a numerical count in both the error register and servo register reaches a predetermined figure hereinafter refered to as a saturated error. Reference is now made to FIG. 16 which represents such means for use with both the error and servo registers. Memories M45, M46, M47 and M48 are representative of memories M40–M43 of servo register sample control 84, FIG. 11, and also memories M11–M14 of error register 76, FIG. 7. Memories M45, M46 and M47 represent the memories which sample the three most significant positions of either the servo or error registers and memory M48 is representative of the sample sign memory. Coincidence gate G69 senses when memories M45, M46 and M47 are set indicating that the register contains binary "1" digits in the three most significant places and has an error count of at least two hundred twenty-four. Gate G69 also senses from memory M48 that the algebraic sign of the error is positive. In response to sensing all of these conditions, gate G69 provides a "1" level output to OR gate 164 which then has a "0" output. Inversion gate G70 will then change the "0" output of OR gate 164 to a "1" output and apply this "1" output designated SAT to either or both of gates 57 and 59, FIG. 1 to interrupt the application of pulse frequency to the command pulse generator 60, and interrupt production of all command pulses. In a similar manner coincidence gate G71 senses if memories M45–M47 are in a reset condition and if the algebraic sign of the error in the register is negative. If so, this is indicative of a negative error of two hundred twenty-five. Gate G71 then applies a "1" signal to OR gate 164 and this is inverted by inversion gate G70 to provide a saturated error signal SAT to gates 57 and 59, FIG. 1. Gates 57 and 59 have both been shown to indicate that the velocity limiting gate may be placed in either position, that is, to interrupt application of pulse frequency $f_1$ to add gates 48 or interrupt application of pulse frequency $f_2$ to command pulse generator 60. It will be apparent that if the application of pulse frequency $f_1$ to add gates is interrupted there will be no further output of pulse frequency $f_2$ from parallel adder 49.

This velocity limiting control is an ON-OFF control and will not affect operation of the system except to slow down the controlled object. As soon as the feedback pulses $f_q$ have either incremented a saturated negative error or decremented a saturated positive error below the saturated error magnitude selected, gates 57 and 59 will be opened and command pulses again applied to all of the servo systems. It is apparent that when pulse frequency $f_2$ is interrupted command pulses $f_x$, $f_y$ and $f_z$ to all of the axes servo systems are interrupted simultaneously. Subsequently when the register with the saturated error has been incremented or decremented to reduce the error below the saturation point the command pulses are again applied to their associated servo systems. However, even when the command pulses are interrupted the servo systems will continue operating in response to the errors stored in the registers thereof, although at a reduced velocity.

As illustrated, the saturated error is detected from the sample logic memories. In such cases the saturated error is decreased below the maximum content of the registers by a count of thirty-two which is the number of clock cycles between sampling. If desired, the saturated error could be detected directly from the memory holding the error bit in the register. For example, in stages 76h and 76i of error register 76 illustrated in FIG. 10 the saturated error could in part be detected from memories M30 and M31.

Quantizer

The quantizer 71 supplies the feedback pulses $f_q$ for each incremental unit of motion of the controlled member. Each feedback pulse $f_q$ represents an incremental unit of movement which is equal to the movement commanded by a command pulse. The feedback pulses $f_q$ are delivered at a rate proportional to the velocity of the controlled object.

A preferred form of quantizer comprises a shaft encoder shown as a disk 165, with equal alternate opaque 166 and transparent 167 sections equally spaced around the face of the disk, shown in part in FIG. 17. Disk 165 is arranged to be mounted on and driven by lead screw 26. Disposed on one side of the disk are two photocells 168 and 169 and oppositely disposed on the other side of the photocells are two light sources, not shown. With the photocells arranged as shown in FIG. 17, they generate irregular sine wave voltages in quadrature, as shown in FIGS. 18a and 18b. FIG. 18a illustrates the waveform generated when a photocell is passed by three transparent sections. The sequence or phase lead of the two outputs of the photocells depends on the direction of rotation of the disk and this direction of rotation ultimately determines whether the feedback $f_q$ pulses will be plus or minus. The two sine wave voltages are fed to Schmitt trigger circuits 73, the outputs of which are synchronized or decoded to provide the feedback pulses $f_q$.

A Schmitt trigger circuit is in essence a squaring circuit such that its output is always a square wave regardless of the shape of the input wave. A Schmitt trigger yields an output so long as the level of the input is of a predetermined magnitude. FIG. 18 illustrates the relationship of the sinusoidal output waves of the photocells 168 and 169 and the corresponding rectangular wave derived from the Schmitt trigger circuits. The Schmitt triggers provide the output waveforms shown in FIGS. 18c and 18d in response to the waveforms of FIGS. 18a and 18b, respectively, produced by photocells 168 and 169. The trigger circuits produce a rectangular pulse whenever each sinusoidal pulse exceeds a predetermined magnitude M. Schmitt trigger circuits are well known to those skilled in the art and need not be explained here in detail. The outputs of the Schmitt trigger circuits PC1 and PC2 are applied to a synchronizer or decoder 74, FIG. 19 which produces $f_q$ and $-f_q$ pulses. Decoder 74 is arranged to sense whenever there is a change in condition of the Schmitt trigger pulses and provide an $f_q$ pulse in response thereto.

Decoder 74 comprises a symmetrical circuit, the left side of which will first be considered. One pulse train PC1 is applied directly to gate G73, and to gate G74 through inversion gate G72. Memory M50 assumes a state dependent upon the level of input PC1, set by a $f_q$ pulse. Gates G73 and G74 besides receiving the PC1 input receive inputs from memory M50 and corresponding gates G73' and G74'. Gates G73 and G74 will detect any discrepancy between the instantaneous state of the PC1 signal and the setting of memory M50. If a discrepancy is detected a signal disables one of gates G75 or G76 and the output thereof will not reset either memory M51 or memory M52. Subsequently gates G77, G78, G79 or G80 sense the discrepancy as stated by a set condition of memory M51 or memory M52, and also memory M50' to determine whether the direction of rotation is positive or negative. When this determination is made one of gates G77, G78, G79 or G80 will produce a $f_q$ or $-f_q$ feedback pulse.

The outputs of gates G77 and G78 provide $f_q$ pulses as do gates G80' and G79'. The outputs of gates G77 and G78 will set memory M50. The outputs of gates G79 and G80 will reset memory M50 to its other state. This removes the discrepancy between memory M50 and the level of PC1, until the level of PC1 changes again. In response thereto memories M51 or M52 will be set to enable or inhibit selected ones of gates G77-G80. The right side of the decoder circuit is identical in operation and construction to those of the left side and corresponding elements bear corresponding identifying numerals primed.

Consideration of the PC1 and PC2 output pulses of the trigger circuits, FIGS. 18c and 18d shows there are four changes of condition. These changes are: PC1 at "1" level and PC2 changes from "1" to "0" level; PC2 at "0" level and PC1 changes from "1" to "0" level; PC1 at "0" level and PC2 changes from "0" to "1" level; and PC2 at "1" level and PC1 changes from "0" to "1" level, which occur in that order when disk 165 is rotating in the indicated direction. When the direction of rotation of disk 165 is reversed, PC2 will lead PC1 and four conditions analogous to those previously pointed out will occur. In response to these eight conditions, gates G77–G80 and G77'–G80' are selectively enabled at C4 to provide an $f_q$ or $-f_q$ pulse. The maximum rate of production of $f_q$ pulses is one per clock cycle.

The operation of decoder 74 may best be understood by reference to Table III in conjunction with FIGS. 18c and 18d. Table III sets forth the condition of the elements of decoder 74 immediately after the times shown in FIGS. 18c and 18d. In the table the "0's" refer to a zero output and the "1's" refer to the negative voltage level output. The set condition of memories M50 and M50' at $t_1$ is representative of the levels of PC1 and PC2 immediately preceding $t_1$.

Memories M50, M52 and M51' are set by an input into their right sides, while memories M50', M52' and M51 are set by inputs into their left sides.

TABLE III

| | $t_1$ | $t_2$ | $t_3$ | $t_4$ |
|---|---|---|---|---|
| PC1 | 1 | 0 | 0 | 1 |
| PC2 | 0 | 0 | 1 | 1 |
| M50 | Set | Set | Reset | Reset |
| M50' | Set | Reset | Reset | Set |
| G72 | 0 | 1 | 1 | 0 |
| G72' | 1 | 1 | 0 | 0 |
| G73 | 0 | 1 | 0 | 0 |
| G73' | 1 | 0 | 0 | 0 |
| G74 | 0 | 0 | 0 | 1 |
| G74' | 0 | 0 | 0 | 0 |
| G75 | 1 | 0 | 1 | 1 |
| G75' | 0 | 1 | 1 | 1 |
| G76 | 1 | 1 | 1 | 0 |
| G76' | 0 | 1 | 1 | 1 |
| M51 | Reset | Set | Reset | Reset |
| M52 | Reset | Reset | Reset | Set |
| M51' | Set | Reset | Reset | Reset |
| M52' | Reset | Reset | Set | Reset |
| G77 | 0 | 1 | 0 | 0 |
| G78 | 0 | 0 | 0 | 1 |
| G79 | 0 | 0 | 0 | 0 |
| G80 | 0 | 0 | 0 | 0 |
| G77' | 0 | 0 | 0 | 0 |
| G78' | 0 | 0 | 0 | 0 |
| G79' | 1 | 0 | 0 | 0 |
| G80' | 0 | 0 | 1 | 0 |

Table III illustrates the operation of decoder 74 when the direction of movement of the controlled object is positive with respect to its path of travel. Under these conditions gates G79', G77, G80' and G78 may provide $f_q$ pulses at times $t_1$, $t_2$, $t_3$, and $t_4$, respectively. When the direction of movement of the controlled object is reversed $-f_q$ pulses may be derived from gates G79, G80, G77' and G78'. It will be apparent that the spacing between successive PC1 pulses and successive PC2 pulses, as well as the width of the pulses will depend on the speed of rotation of disk 165.

The time interval $t_1$–$t_4$ in FIG. 18 represents the time required for the disk to move two sections past a photocell.

From the foregoing disclosure, it may be seen that the objects of the invention set forth, as well as those made apparent from the detailed description are efficiently attained. Certain features disclosed herein but not claimed are the invention of Johann F. Reuteler, and are claimed in his co-pending application Ser. No. 349,216, filed on the same date, and assigned to the same assignee as this application.

While a preferred embodiment of the invention has been illustrated and described for purposes of disclosure, modifications to the disclosed embodiments of the invention as well as other embodiments thereof which do not depart from the scope of the invention may occur to those skilled in the art. Accordingly, the appended claims are intended to encompass all embodiments of the invention which do not depart from the spirit and scope of the invention.

What is claimed is:

1. A system for moving an object a desired distance in a predetermined interval of time comprising, means for supplying a command signal indicative of the extent of movement and velocity of movement of the object, means for deriving a feedback signal indicative of the actual extent of movement of the object and velocity of movement of the object, means for algebraically comparing the command and feedback signals to derive a signal indicative of the error between the commanded velocity and the actual velocity of the object, means for integrating the error signal to derive a representation of the difference between the commanded position and the actual position and producing a velocity signal proportional to said position representation, means for algebraically comparing the velocity signal with the feedback signal to derive a signal proportional to a new velocity of the object required to eliminate the error, and means for utilizing the last mentioned signal to eliminate the velocity error.

2. The system of claim 1 further including means for sensing when the representation exceeds a predetermined magnitude and interrupting the command signal until the feedback signal decreases the representation below the predetermined magnitude.

3. The system of claim 1 wherein said means for integrating comprises a binary bi-directional counter, and the command signal and feedback signal are in the form of pulse frequencies having repetition rates proportional to the commanded velocity and actual velocity, respectively.

4. The system of claim 3 wherein said means for producing a velocity signal proportional to said position representation comprises means providing a plurality of binarily related pulse frequencies, and means for summing selected one of the binarily related pulse frequencies in accordance with said position representation.

5. A system for moving an object a desired distance in a predetermined interval of time comprising, means for supplying a command signal indicative of the extent of movement and velocity of movement of the object, means for deriving a feedback signal indicative of the actual extent of movement of the object and velocity of movement of the object, means for algebraically comparing the command and feedback signals to derive a signal indicative of the error between the commanded velocity and the actual velocity of the object, means for integrating the error signal to derive a representation of the difference between the commanded position and the actual position and producing a velocity signal proportional to said position representation, means for algebraically comparing the velocity signal with the feedback signal to derive a signal proportional to a new velocity of the object required to eliminate the velocity error, means for storing a numerical representation of the new velocity signal, and means responsive to said last mentioned representation to move the object so as to eliminate the velocity error.

6. In a system for moving an object a distance proportional to a number of command pulses at a velocity proportional to the rate of repetition of the command pulses, each command pulse representing an incremental distance of movement of the object, means for deriving feedback pulses proportional in number to the movement of the object and in rate of repetition to the velocity of the object; means for comparing the command pulses and the feedback pulses to derive a pulse frequency indicative of the error between commanded velocity of the object and actual velocity thereof, comprising means for algebraically summing the command and feedback pulses to establish a numerical representation of the error between the commanded position and the actual position of the object, means responsive to the representation for producing a series of pulses having a rate of repetition proportional to the position error representation, means for comparing the series of pulses with the feedback pulses to derive a second pulse frequency having a repetition rate indicative of a velocity of the object required to eliminate the error between commanded velocity and actual velocity, and means for utilizing the second pulse frequency to change the velocity of the object.

7. In a system for moving an object a distance proportional to a number of command pulses at a velocity proportional to the rate of repetition of the command pulses, each command pulse representing an incremental distance of movement of the object; means for applying command pulses to the system, means for deriving feedback pulses proportional in number to the movement of the object and in rate of repetition to the velocity of the object; means for comparing the command pulses and the feedback pulses to derive a pulse frequency indicative of the error between commanded velocity of the object and actual velocity thereof, comprising means for algebraically summing the command and feedback pulses to establish a numerical representation of the error between the commanded position and the actual position of the object, means responsive to the representation for producing a series of pulses having a rate of repetition proportional to the position error representation, means for comparing the series of pulses with the feedback pulses to derive a second pulse frequency having a repetition rate indicative of a velocity of the object required to eliminate the error between commanded velocity and actual velocity, and means for utilizing the second pulse frequency to change the velocity of the object.

8. The system of claim 7 wherein said means for summing is a bi-directional pulse counter and means are provided for interrupting the application of command pulses to the system when the numerical representation in said counter reaches a predetermined magnitude until the feedback pulses decrease the numerical representation below said predetermined magnitude.

9. In a system for moving an object a distance proportional to a number of command pulses at a velocity proportional to the rate of repetition of the command pulses, each command pulse representing an incremental distance of movement of the object; means for deriving feedback pulses proportional in number to the movement of the object and in rate of repetition to the velocity of the object, comprising means for comparing the command pulses and the feedback pulses to derive a pulse frequncy indicative of the error between commanded velocity of the object and actual velocity thereof, means for algebraically summing the command and feedback pulses to establish a numerical representation of the error between the commanded position and the actual position of the object, means responsive to the representation for producing a serics of pulses having a rate of repetition proportional to the position error representation, means for comparing the series of pulses with the feedback pulses to derive a second pulse frequency indicative of a velocity of the object required to eliminate the error between commanded velocity and actual velocity, means for summing the pulses of the second pulse frequency and establishing a numerical representation of the required velocity, and means responsive to the last-mentioned numerical representation for changing the velocity of the object.

10. In a system for moving an object a distance proportional to a number of command pulses at a velocity proportional to the rate of repetition of the command pulses, each command pulse representing an incremental distance of movement of the object; means for applying command pulses to the system, means for deriving feedback pulses proportional in number to the movement of the object and in rate of repetition to the velocity of the object, means for comparing the command pulses and the feedback pulses to derive a pulse frequency indicative of the error between commanded velocity of the object and actual velocity thereof, comprising means for algebraically summing the command and feedback pulses to establish a numerical representation of the error between the commanded position and the actual position of the object, means responsive to the representation for producing a series of pulses having a rate of repetition proportional to the position error representation, means for comparing the series of pulses with the feedback pulses to derive a second pulse frequency having a repetition rate indicative of a velocity of the object required to eliminate the error between commanded velocity and actual velocity, means for algebraically summing the pulses of the second pulse frequency and establishing a numerical representation of the required velocity, and means responsive to the last-mentioned numerical representation for changing the velocity of the object.

11. The system of claim 10 wherein both of said means for summing comprise bi-directional pulse counters and means are provided for interrupting the application of command pulses to the system if the numerical representation in either of said counters reach a predetermined magnitude until the feedback pulses decrease the numerical representation below said predetermined magnitude.

12. In a system for moving an object a distance proportional to a number of command pulses at a velocity proportional to the rate of repetition of the command pulses, each command pulse representing an incremental distance of movement of the object; means for deriving feedback pulses proportional in number to the movement of the object and in rate of repetition to the velocity of the object, means for comparing the command pulses and the feedback pulses to derive a pulse frequency indicative of the error between commanded velocity of the object and actual velocity thereof, comprising means for algebraically summing the command and feedback pulses to establish a numerical representation of the error between the commanded position and the actual position of the object, means responsive to the representation for producing a series of pulses having a rate of repetition proportional to the position error representation, means for comparing the series of pulses with the feedback pulses to derive a second pulse frequency having a repetition rate indicative of a velocity of the object required to eliminate the error between commanded velocity and actual velocity, means for algebraically summing the pulses of the second pulse frequency and establishing a numerical representation of the required velocity, means responsive to said last-mentioned numerical representation for producing a third pulse frequency proportional in number of pulses and in repetition rate to said last-mentioned numerical representation, and means responsive to the third pulse frequency for changing the velocity of the object.

13. In a system for moving an object a distance proportional to a number of command pulses at a velocity proportional to the rate of repetition of the command pulses, including means for providing a train of command pulses, means for deriving a train of feedback pulses proportional in number to the movement of the object and in rate of repetition to the velocity of the object, bi-directional pulse counting means, means for applying the command and feedback pulses to the counting means to establish a numerical representation of the error existing between the commanded position of the object and the actual position thereof; means for generating a series of pulses in an interval of time which is proportional in number and repetition rate to the numerical representation, means for algebraically summing the pulses of the series with the feedback pulses to provide a second series of pulses, and means for utilizing the second series of pulses to control the velocity of the object.

14. In a system for moving an object a distance proportional to a number of command pulses at a velocity proportional to the rate of repetition of the command pulses, including means for providing a train of command pulses, means for deriving a train of feedback pulses proportional in number to the movement of the object and in rate of repetition to the velocity of the object, a bi-directional pulse counter, means for applying the command and feedback pulses to the counter to establish a numerical representation of the error existing between the commanded position of the object and the actual position thereof, means for generating a series of pulses in an interval of time which is proportional in number and repetition rate to the numerical representation, a second bi-directional pulse counter, means for applying the series of pulses and the feedback pulses to said second bi-directional counter to establish a numerical representation of the algebraic difference therebetween, means for generating a second series of pulses in an interval of time which is proportional in number and repetition rate to the numerical representation in said second bi-directional counter, and means for utilizing the second series of pulses to control the velocity of the object.

15. In a system for controlling with pulse signals the relative incremental motion along separate coordinates of first and second members to effect a desired operation along a predetermined path including means for producing a train of command pulses, means to derive from the train of pulses a series of pulses for each of the separate coordinates, a drive system for each coordinate, means for applying one of the series of pulses to each of said drive systems, each of said drive systems including mean for generating feedback pulses, each feedback pulse being indicative of an increment of motion of a member and equal to the increment of motion commanded by a command pulse, each drive system including summing means for storing a numerical representation of the algebraic sum of the number of command and feedback pulses received thereby to provide an indication of the position error existing between the commanded and actual positions of a member; means for sensing when the stored position error in any of the summing means reaches a predetermined magnitude, means responsive to said sensing means for interrupting production of said train of command pulses and all the series of pulses until the position error in the summing means decreases below said predetermined magnitude.

16. In a system for controlling with pulse signals the relative incremental motion along separate coordinates of first and second members to effect a desired operation along a predetermined path, including means for producing a train of command pulses for each of the separate coordinates, a drive system for each coordinate, means for applying one of the trains of pulses to each of said drive systems, each of said drive systems including means for generating feedback pulses, each feedback pulse being indicative of an increment of motion of the member and equal to the increment of motion commanded by a command pulse, each drive system including summing means for storing a numerical representation of the algebraic sum of the number of command and feedback pulses received thereby to provide an indication of the position error existing between the commanded and actual positions of a member; means for sensing when the stored position error in any of the summing means reaches a predetermined magnitude, means responsive to said sensing means for interrupting production of the command pulse trains until the position error in the summing means decreases below said predetermined magnitude.

17. The system of claim 16 wherein the summing means is a bi-directional pulse counter and the predetermined magnitude is less than the numerical capacity of the counter.

18. In a system for controlling with pulse signals the movement of an object including means to produce a train of command pulses, a drive system for moving the object, the drive system including means for generating feedback pulses, each feedback pulse being indicative of an increment of motion of the member and equal to the increment of motion commanded by a command pulse, summing means for storing a numerical representation of the algebraic sum of the number of command and feedback pulses received thereby to provide an indication of the position error existing between the commanded and actual position of the object; means for sensing when the position error reaches a predetermined magnitude which is less than the capacity of said summing means, and means responsive to said means for interrupting production of the command pulse until the position error in the summing means decreases below said predetermined value.

19. In a system for controlling with pulse signals the movement of an object including means to produce a train of command pulses, a drive system for moving the object, the drive system including means for generating feedback pulses, each feedback pulse being indicative of an increment of motion of the member and equal to the increment of motion commanded by a command pulse, summing means for storing a numerical representation of the algebraic sum of the number of command and feedback pulses received thereby to provide an indication of the position error existing between the commanded and actual position of the object; means for sensing when the position error reaches a predetermined magnitude and means responsive to said sensing means for interrupting production of said command pulses until the feedback pulses decrease the position error in the summing means below said predetermined magnitude.

20. In combination, a bi-directional pulse counter, means for applying incrementing pulses to said counter, means responsive to the number held in said counter for moving an object, means responsive to movement of the object for applying decrementing pulses to said counter, means for sensing when the number in the counter reaches a predetermined magnitude, and means responsive to said sensing means for interrupting application of incrementing pulses to said counter until the decrementing pulses have reduced the number in said counter below said predetermined magnitude.

21. In combination, a bi-directional pulse counter having incrementing and decrementing inputs, means for applying command pulses to one of said inputs, means responsive to the number held in said counter for moving an object, means responsive to movement of the object for applying feedback pulses to the other of said inputs, each feedback pulse representing the same incremental distance of movement as a command pulse, means for sensing when the absolute number in the counter reaches a predetermined magnitude, and means responsive to said sensing means for interrupting application of command pulses to said counter until the feedback pulses have reduced the absolute number in said counter below said predetermined magnitude.

22. A system for controlling with pulse trains the synchronized movement of a plurality of objects, including means for producing a train of command pulses at a predetermined repetition rate, pulse distributing means, a gate circuit for transmitting the command pulses to said pulse distributing means, said pulse distributing means being adapted to produce a plurality of second trains of pulses in response to application of the command pulses thereto, each of the second pulse trains having a number of pulses proportional to the distance it is desired to move an object, servo means for moving each of the objects, each of said servo means being responsive to the application of one of said second pulse trains to move its associated object, each of said servo means including means for measuring the actual movement of its associated object and comparing the actual movement with the commanded movement and provide an indication of the error therebetween, and means responsive to the error indication for moving said objects, means for sensing said error indication, and means responsive to said sensing means detecting an error indication above a predetermined magnitude for inhibiting said gate circuit until the error decreases below said predetermined value.

23. A system for controlling with pulse trains the synchronized movement of a plurality of objects, including means for producing a train of command pulses at a predetermined repetition rate; pulse distributing means, said pulse distributing means including storage means to hold a representation of the distance it is desired to move each axis with respect to an axis of movement, said pulse distributing means being responsive to said command pulses and said storage means to produce a plurality of second pulse trains having a number of pulses proportional to the distance it is desired to move an object; servo means for moving each of the objects, each of said servo means being responsive to the application of one of said second pulse trains to move its associated object and including means for measuring the actual movement of its associated object and comparing the actual movement with the commanded movement and provide an indication of the error therebetween, and means responsive to the error indication for moving said objects; means for sensing said error indication, and means responsive to said sensing means detecting an error indication above a predetermined magnitude for interrupting application of said first train of pulses to said pulse distributing means until the error decreases below said predetermined value.

24. The invention of claim 23 wherein said interrupting means comprises a transmission circuit arranged to apply the first train of pulses to said pulse distributing means, said pulse transmission circuit being responsive to said sensing means to inhibit transmission of the command pulses to said pulse distributing means when the detected error is above said predetermined magnitude.

25. The invention of claim 23 wherein said interrupting means is effective to inhibit production of the command pulses when the detected error is above said predetermined magnitude.

26. A system for controlling with pulse trains the synchronized movement of a plurality of objects, including means for producing a train of command pulses at a predetermined repetition rate; pulse distributing means, said pulse distributing means including storage means to hold a representation of the distance it is desired to move each axis with respect to an axis of movement, said pulse distributing means being responsive to said command pulses and said storage means to produce a plurality of second pulse trains having a number of pulses proportional to the distance it is desired to move an object; servo means for moving each of the objects, each of said servo means being responsive to the application of one of said second pulse trains to move its associated object and including means for measuring the actual movement of its associated object and comparing the actual movement with the commanded movement and provide an indication of the error therebetween, and means responsive to the error indication for moving said objects; means for sensing said error indication, and means responsive to said sensing means detecting an error indication above a predetermined magnitude for interrupting production of the command pulses until the error decreases below said predetermined value.

27. A system for controlling with pulse trains the synchronized movement of a plurality of objects, including means for producing a train of command pulses at a predetermined repetition rate; interpolation means, said interpolation means being arranged to receive and store in numerical form a plurality of signals each indicative of a distance one of the objects is to be moved, said interpolation means being responsive to application of said command pulses thereto to produce a plurality of second pulse trains each continuing a number of pulses proportional to a stored signal; servo means for moving each of said objects, each of said servo means being responsive to the application of one of said second pulse trains to move its associated object, each of said servo means including means for measuring the actual movement of its associated object and comparing the actual movement with the commanded movement and provide an indication of the error therebetween and means responsive to the error indication for moving said objects; and means for sensing said error indication; and inhibiting operation of said interpolating means when said error indication is above a predetermined magnitude.

28. In combination, a plurality of pulse responsive servo systems for moving objects at controlled rates to define a predetermined resultant path, each of said servo systems being responsive to the number of pulses received to move its associated object a distance proportional to the number of pulses received, each of said servo systems having means for measuring the actual movement of its associated object and comparing the actual movement with the movement commanded by the pulses received thereby and provide an indication of the error therebetween, means responsive to the error indication for moving the object, means for producing a train of pulses at a predetermined frequency, means for distributing said pulses to said servos in numbers proportional to the distance each object is to be moved, and means responsive to the errors for interrupting application of said pulses to said distributing means when an error indication exceeds a predetermined value.

29. A system for moving an object the predetermined distance comprising, means for supplying a command signal indicative of the extent of movement and velocity of movement of the object, means for deriving a feedback signal indicative of the actual extent of movement of the object and velocity of movement of the object, means for comparing the command and feedback signals to derive a signal indicative of the error between the commanded velocity and the actual velocity of the object, means for integrating the error signal to derive a representation of the difference between the commanded position and the actual position of the object and producing a velocity signal proportional to said position representation, means for comparing the velocity signal with the feedback signal to derive a signal proportional to a new velocity of the objects required to eliminate the error, and means for utilizing the last mentioned signal to eliminate the error.

30. In combination, a plurality of pulse-responsive servo systems for moving objects at controlled rates to define a predetermined resultant path, each of said servo systems being responsive to the number of pulses received to move its associated object a distance proportional to the number of pulses received, each of said servo systems having means for measuring the actual movement of its associated object and comparing the actual movement with the movement commanded by the pulses received thereby and provide an indication of the error therebetween, means responsive to the error indication for moving the object, means for producing a first train of pulses at a predetermined frequency, means responsive to said first train of pulses for providing pulses to each of said servos in numbers proportional to the distance each object is to be moved, and means responsive to the errors for interrupting application of said first pulse train to said providing means when an error indication exceeds a predetermined value.

References Cited
UNITED STATES PATENTS

| | | | |
|---|---|---|---|
| 3,069,608 | 12/1962 | Forrester et al. | 318—162 |
| 3,246,125 | 4/1966 | Mergler | 318—18 XR |

BENJAMIN DOBECK, *Primary Examiner.*